(12) United States Patent
Koizumi et al.

(10) Patent No.: US 10,412,309 B2
(45) Date of Patent: Sep. 10, 2019

(54) IMAGE CAPTURE DEVICE, METHOD OF IMAGE CAPTURE, SIGNAL PROCESSING DEVICE, METHOD OF SIGNAL PROCESSING, AND PROGRAM

(71) Applicant: Sony Corporation, Tokyo (JP)

(72) Inventors: Makoto Koizumi, Kanagawa (JP); Hiroyuki Tanaka, Kanagawa (JP); Jun Ono, Kanagawa (JP); Daisuke Kawamata, Kanagawa (JP); Masakatsu Fujimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 19 days.

(21) Appl. No.: 15/560,227

(22) PCT Filed: Apr. 1, 2016

(86) PCT No.: PCT/JP2016/060894
§ 371 (c)(1),
(2) Date: Sep. 21, 2017

(87) PCT Pub. No.: WO2016/167137
PCT Pub. Date: Oct. 20, 2016

(65) Prior Publication Data
US 2018/0084175 A1    Mar. 22, 2018

(30) Foreign Application Priority Data
Apr. 13, 2015 (JP) .................. 2015-081607

(51) Int. Cl.
*H04N 5/235* (2006.01)
*H04N 5/243* (2006.01)
(Continued)

(52) U.S. Cl.
CPC ............ *H04N 5/2352* (2013.01); *B60R 1/00* (2013.01); *H04N 5/225* (2013.01); *H04N 5/232* (2013.01);
(Continued)

(58) Field of Classification Search
CPC .. H04N 5/2357; H04N 5/2352; H04N 5/2353; H04N 5/23277
See application file for complete search history.

(56) References Cited

U.S. PATENT DOCUMENTS

2009/0309972 A1* 12/2009 Tonokawa ............... B60R 1/00
                                                          348/148
2011/0122304 A1*  5/2011 Sedelnikov .......... H04N 5/2353
                                                          348/294

FOREIGN PATENT DOCUMENTS

JP  2007-161189 A   6/2007
JP  2009-017293 A   1/2009
JP  2009-278496 A  11/2009

OTHER PUBLICATIONS

International Search Report and Written Opinion and English translation thereof dated Jun. 21, 2016 in connection with International Application No. PCT/JP2016/060894.
(Continued)

*Primary Examiner* — Ahmed A Berhan
(74) *Attorney, Agent, or Firm* — Wolf, Greenfield & Sacks, P.C.

(57) ABSTRACT

The present technology relates to an image capture device, a method of image capture, a signal processing device, a method of signal processing, and a program capable of capturing reliably a blinking image capture target. A predetermined image capture timing of an image capture unit is controlled so that image capture is performed N times during an exposure time in which at least a part of a turn-on period in which an image capture target is on overlaps with an
(Continued)

exposure time of image capture of at least one time at a timing of dividing a blinking cycle in which the image capture target to be captured by the image capture unit configured to perform image capture at the image capture timing blinks into N equal parts where N represents more than one. The present technology is applicable to, in one example, a camera unit or the like used to capture an image.

19 Claims, 34 Drawing Sheets

(51) Int. Cl.
 *H04N 5/232* (2006.01)
 *B60R 1/00* (2006.01)
 *H04N 5/225* (2006.01)

(52) U.S. Cl.
 CPC ....... *H04N 5/2353* (2013.01); *H04N 5/23254* (2013.01); *H04N 5/23277* (2013.01); *H04N 5/243* (2013.01)

(56) References Cited

OTHER PUBLICATIONS

International Preliminary Report on Patentability and English translation thereof dated Oct. 26, 2017 in connection with International Application No. PCT/JP2016/060894.

\* cited by examiner

FIG.27
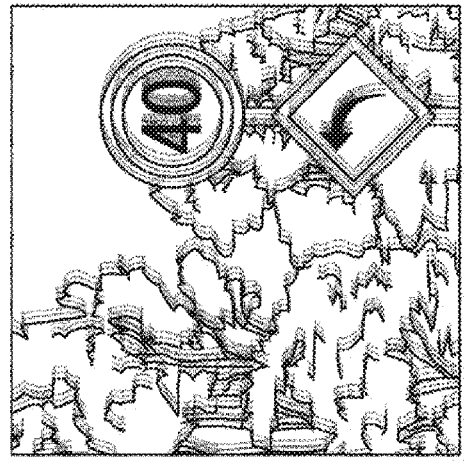
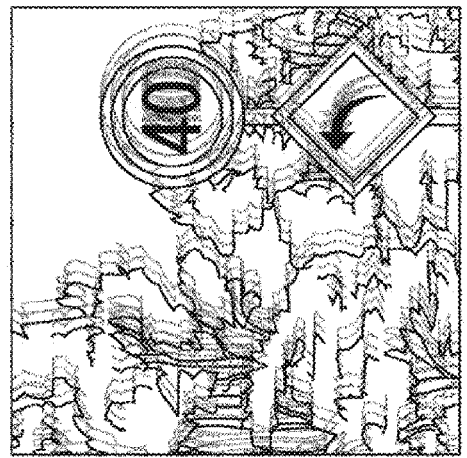

FIG.31

| Condition | | | | LED Light Visibility | | | |
|---|---|---|---|---|---|---|---|
| Luminosity | Target | LED light emission | | COMMERCIALLY AVAILABLE PRODUCT | NORMAL MODE | NEW HIGH-SPEED MODE AVERAGE VALUE ave | NEW HIGH-SPEED MODE MAXIMUM VALUE max |
| | | frequency [Hz] | duty [%] | | | | |
| Day | Signal | 100 | 70 | × | × | ○ | ◎ |
| Day | Traffic Sign | 250 | 50 | × | × | ○ | ◎ |
| Night | Signal | 100 | 70 | △ | △ | ○ | ○ |
| Night | Traffic Sign | 250 | 20 | △ | × | ◎ | ○ |

NO TURNING OFF, NO UNEVENNESS IN BRIGHTNESS, AND MOST SATISFACTORY VISIBILITY

NO TURNING OFF, LESS BLUR OF MOVING OBJECT, LESS NOISE, AND MOST SATISFACTORY VISIBILITY

NO TURNING OFF, BUT FLUCTUATION IN BRIGHTNESS IN LONG CYCLE

NO TURNING OFF, BUT DIFFICULTY IN DISTINGUISHING COLORS OF TRAFFIC SIGNAL DUE TO SATURATION
FAILURE IN DISTINGUISHING NUMBERS ON TRAFFIC SIGN WITH MOTION BLUR DUE TO LONG EXPOSURE TIME

US 10,412,309 B2

IMAGE CAPTURE DEVICE, METHOD OF IMAGE CAPTURE, SIGNAL PROCESSING DEVICE, METHOD OF SIGNAL PROCESSING, AND PROGRAM

This application claims the benefit under 35 U.S.C. § 371 as a U.S. National Stage Entry of International Patent Application Serial No. PCT/JP2016/060894, filed Apr. 1, 2016, entitled "IMAGE CAPTURE DEVICE, METHOD OF IMAGE CAPTURE, SIGNAL PROCESSING DEVICE, METHOD OF SIGNAL PROCESSING, AND PROGRAM", which claims priority under 35 U.S.C. § 119(a)-(d) or 35 U.S.C. § 365(b) to Japanese application number JP2015-081607, filed Apr. 13, 2015, the entire contents of which are incorporated herein by reference in their entireties.

TECHNICAL FIELD

The present technology relates to image capture devices, methods of image capture, signal processing devices, methods of signal processing, and programs, and in particular, to an image capture device, a method of image capture, a signal processing device, a method of signal processing, and a program, in one example, capable of capturing reliably a blinking image capture target.

BACKGROUND ART

A light source for traffic signals or electronic traffic signs is recently being replaced from incandescent lamps or the like to light emitting diodes (LEDs).

LEDs have a faster blinking response speed than incandescent lamps. Thus, in one example, an LED-based traffic signal or traffic sign captured by an onboard camera or the like that is mounted on an automobile or the like may occur flicker, and so the traffic signal or traffic sign may be captured while being turned off.

In a captured image captured by an onboard camera, a traffic signal or traffic sign projected in a turned-off state may cause acceptability as evidence in the event of an accident to be limited in a case where the onboard camera is used as, in one example, a dash cam.

In addition, in a captured image captured by an onboard camera, a traffic signal or traffic sign projected in a turned-off state may cause troubles in drive control including stopping of an automobile in a case where the captured image captured by the onboard camera is used for, in one example, automatic driving of an automobile.

Thus, a method of image capture is developed in which the image capture is performed, in a case where an object having a blinking light source such as traffic signals is used as an image capture target, during the exposure time exceeding a turn-off period in which the blinking light source is turned off (see, e.g., Patent Literature 1).

Further, a method is developed in which the image capture is performed a plurality of times during the period of the frame rate of the output image at the frame rate exceeding a frame rate of an output image to be output that is captured by the onboard camera (e.g., Patent Literature 2). Then, among the plurality of captured images obtained by the image capture performed a plurality of times, one captured image is randomly selected as the output image.

CITATION LIST

Patent Literature

Patent Literature 1: JP 2007-161189A
Patent Literature 2: JP 2009-278496A

DISCLOSURE OF INVENTION

Technical Problem

In a case where the image capture is performed during the exposure time exceeding the turn-off period in which the blinking light source is turned off, the exposure may be excessive under the condition of image capture with high illuminance outdoors or the like in fine weather, which may lead to decrease in visibility of the blinking light source.

Further, in the case where one captured image is randomly selected as the output image among the plurality of captured images obtained by the image capture performed a plurality of times at the frame rate exceeding the frame rate of the output image, a captured image in which the blinking light source projects in a turned-off state may be selected as the output image.

The present technology is made in view of such a situation, and it allows a blinking image capture target to be captured reliably.

Solution to Problem

An image capture device or program according to the present technology is an image capture device including: an image capture unit configured to capture an image at a predetermined image capture timing; and a control unit configured to control the image capture timing so that image capture is performed N times during an exposure time in which at least a part of a turn-on period in which an image capture target is on overlaps with an exposure time of image capture of at least one time at a timing of dividing a blinking cycle in which the image capture target to be captured by the image capture unit blinks into N equal parts where N represents more than one, or a program causing a computer to function as a control unit included in such an image capture device.

A method of image capture according to the present technology is a method of image capture including: controlling a predetermined image capture timing so that image capture is performed N times during an exposure time in which at least a part of a turn-on period in which an image capture target is on overlaps with an exposure time of image capture of at least one time at a timing of dividing a blinking cycle in which the image capture target to be captured by an image capture unit configured to perform image capture at the image capture timing blinks into N equal parts where N represents more than one.

In the image capture device, method of image capture, and program as described above, a predetermined image capture timing is controlled so that image capture is performed N times during an exposure time in which at least a part of a turn-on period in which an image capture target is on overlaps with an exposure time of image capture of at least one time at a timing of dividing a blinking cycle in which the image capture target to be captured by an image capture unit configured to perform image capture at the image capture timing blinks into N equal parts where N represents more than one.

A signal processing device or program according to the present technology is a signal processing device including: a processing unit configured to process N captured images obtained by image capture performed N times and to generate an output image of one frame, the image capture being performed N times by controlling a predetermined image capture timing so that the image capture is performed N times during an exposure time in which at least a part of a turn-on period in which an image capture target is on overlaps with an exposure time of image capture of at least one time at a timing of dividing a blinking cycle in which the image capture target to be captured by an image capture unit configured to perform image capture at the image capture timing blinks into N equal parts where N represents more than one, or a program causing a computer to function as such a signal processing device.

A method of signal processing according to the present technology is a method of signal processing including: processing N captured images obtained by image capture performed N times and generating an output image of one frame, the image capture being performed N times by controlling a predetermined image capture timing so that the image capture is performed N times during an exposure time in which at least a part of a turn-on period in which an image capture target is on overlaps with an exposure time of image capture of at least one time at a timing of dividing a blinking cycle in which the image capture target to be captured by an image capture unit configured to perform image capture at the image capture timing blinks into N equal parts where N represents more than one.

In a signal processing device, method of signal processing, and program according to the present technology, N captured images obtained by image capture performed N times are processed and an output image of one frame is generated, the image capture being performed N times by controlling a predetermined image capture timing so that the image capture is performed N times during an exposure time in which at least a part of a turn-on period in which an image capture target is on overlaps with an exposure time of image capture of at least one time at a timing of dividing a blinking cycle in which the image capture target to be captured by an image capture unit configured to perform image capture at the image capture timing blinks into N equal parts where N represents more than one.

Moreover, the image capture device and the signal processing device may be an independent device or an internal block that constitutes a single device.

Further, the program may be provided by being transmitted via a transmission medium or recorded on a recording medium.

Advantageous Effects of Invention

The present technology allows a blinking image capture target to be captured reliably.

Further, the effects described herein are not necessarily limited, and any effect described in the present disclosure may be included.

BRIEF DESCRIPTION OF DRAWINGS

FIG. 27 is a diagram illustrating an example of an output image generated by generation processing.

FIG. 31 is a diagram illustrating an example of evaluation of the visibility of a commercially available camera output image, a normal mode output image, an output image with the average value ave, and an output image with the maximum value max, obtained by image capture during daytime and nighttime.

MODE(S) FOR CARRYING OUT THE INVENTION

<Embodiment of Camera Unit to which Present Technique is Applied>

Figure 1:
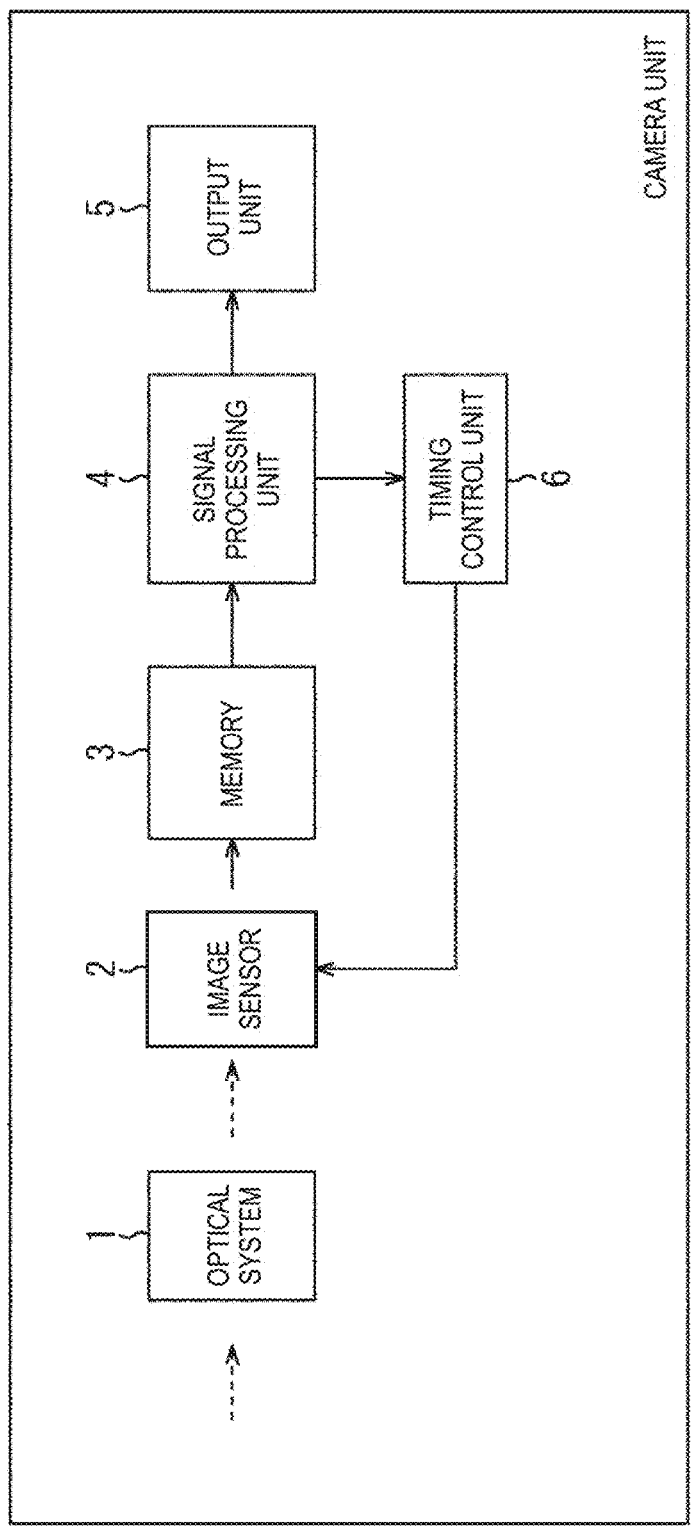
FIG. 1 is a block diagram illustrating a configuration example of one embodiment of a camera unit serving as an image capture device to which the present technology is applied.

FIG. 1 is a block diagram illustrating a configuration example of an embodiment of a camera unit serving as an image capture device to which the present technology is applied.

Moreover, the camera unit is capable of capturing both a still image and a moving image.

In FIG. 1, the camera unit has an optical system 1, an image sensor 2, a memory 3, a signal processing unit 4, an output unit 5, and a timing control unit 6.

The optical system 1 has, in one example, a zoom lens (not illustrated), a focus lens, a diaphragm, or the like, and makes light from the outside incident on the image sensor 2 to form an image.

The image sensor 2 is, in one example, a complementary metal-oxide-semiconductor (CMOS) image sensor. The image sensor 2 receives incident light from the optical system 1, performs photoelectric conversion on it, and captures an image (its image data) to be captured corresponding to the incident light from the optical system 1.

Specifically, the image sensor 2 functions as an image capture unit that performs image capture at an image capture timing specified by the timing control unit 6. The image sensor 2 performs image capture N times, where N represents more than one, in a period of the frame rate of an output image that is output by the output unit 5 described later, and sequentially outputs N captured images obtained by the image capture performed N times.

The memory 3 sequentially stores the N captured images that are sequentially output by the image sensor 2, and supplies the N captured images to the signal processing unit 4 simultaneously.

The signal processing unit 4 performs processing on the N captured images from the memory 3, and generates an output image of one frame (single piece of frame). Further, the signal processing unit 4 performs processing such as noise removal, white balance (WB) adjustment, or the like on the output image, and supplies the result to the output unit 5.

In addition, the signal processing unit 4 detect (wave detect) the brightness of the N captured images from the memory 3, sets an exposure time at which the brightness of a captured image becomes an appropriate level as an appropriate exposure time, and supplies it to the timing control unit 6.

The output unit 5 outputs an output image from the signal processing unit 4.

Specifically, the output unit 5 has, in one example, a display (not illustrated) composed of liquid crystal or the like, and displays the output image from the signal processing unit 4 as a so-called through-the-lens image.

In addition, the output unit 5 has, in one example, a driver (not illustrated) configured to drive a recording medium such as a semiconductor memory, a magnetic disk, and an optical disk, and records the output image from the signal processing unit 4 on the recording medium.

The timing control unit 6 controls the image capture timing of the image sensor 2.

Specifically, the timing control unit 6 controls the image capture timing of the image sensor 2 so that the image capture is performed at the timing of dividing the blinking cycle in which an image capture target intended to be captured by the image sensor 2 blinks into N equal parts where N represents more than one.

Further, the timing control unit 6 controls the image capture timing of the image sensor 2 so that the image capture may be performed during an exposure time at which at least a part of the turn-on period in which the image capture target is on overlaps with an exposure time of image capture of at least one of N times.

Moreover, in a case where the appropriate exposure time supplied from the signal processing unit 4 is longer than a lower limit exposure time SHT_MIN described later, the timing control unit 6 controls the image capture timing of the image sensor 2 so that the image capture may be performed during the appropriate exposure time supplied from the signal processing unit 4.

In addition, in a case where the appropriate exposure time supplied from the signal processing unit 4 is less than or equal to the lower limit exposure time SHT_MIN, the timing control unit 6 controls the image capture timing of the image sensor 2 so that the image capture may be performed during the minimum exposure time at which the image sensor 2 is capable of being operated normally within the exposure time larger than the lower limit exposure time SHT_MIN.

In the digital camera configured as described above, the image sensor 2 captures and outputs the N captured images under the control of the timing control unit 6.

The N captured images output from the image sensor 2 are supplied to the memory 3 and stored therein. The signal processing unit 4 processes the N captured images stored in the memory 3 to generate a one-frame output image. Furthermore, the signal processing unit 4 performs necessary signal processing such as WB adjustment on the output image, and supplies the result to the output unit 5. The output image from the signal processing unit 4 is output through the output unit 5.

The camera unit of FIG. 1 is applicable to, in one example, any electronic device equipped with an image capture function, such as digital cameras, onboard cameras mounted on an automobile or the like, and monitoring cameras installed on a highway or the like.

In this regard, an example of the image capture mode of the camera unit in FIG. 1 includes a normal mode, a high-speed mode, and a new high-speed mode.

In the normal mode, image capture is performed one time during the period of the frame rate of the output image, and a captured image obtained as a result of the image capture is output as an output image.

In the high-speed mode, image capture is performed a plurality of times during the period of the frame rate of the output image, and one captured image is selected randomly among a plurality of captured images obtained by the image capture performed a plurality of times.

In the new high-speed mode, as described above, the image capture is performed N times during the exposure time at which at least a part of the turn-on period in which an image capture target is on overlaps with an exposure time of image capture of at least one time at the timing of dividing the blinking cycle in which the image capture target to be captured by the image sensor 2 blinks into N equal parts.

<Example of Capturing Blinking Image Capture Target>

Figure 2:
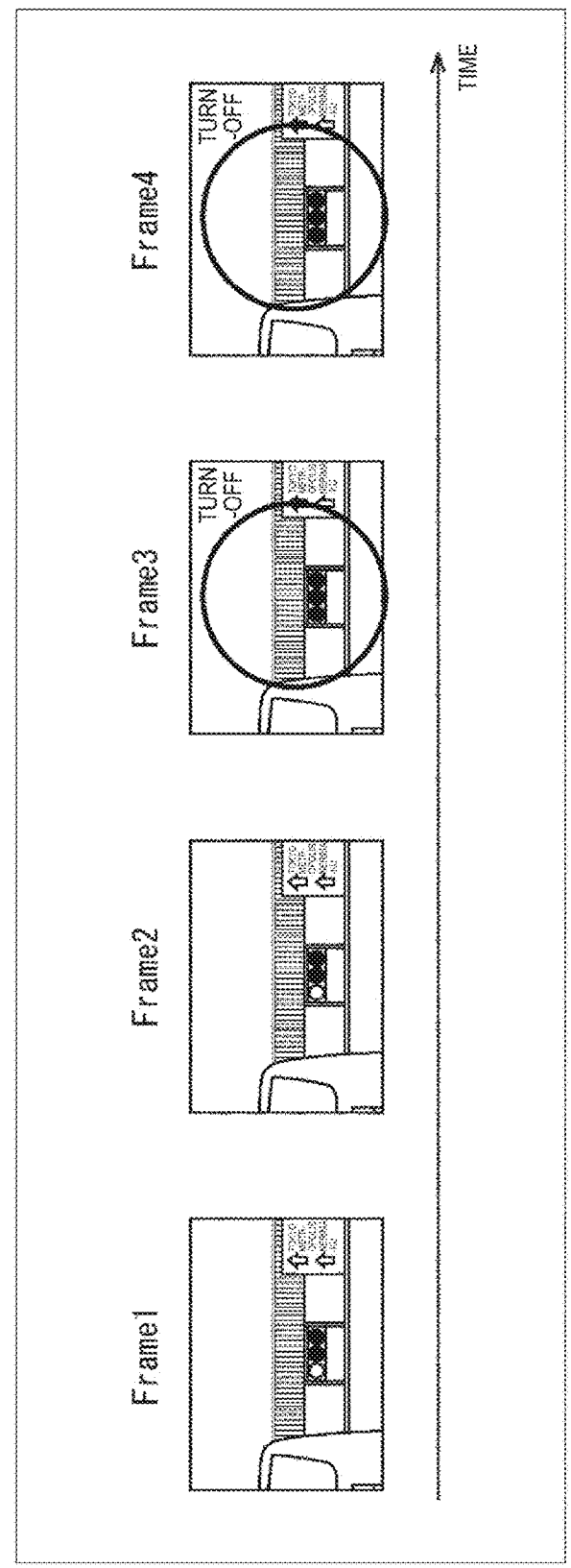
FIG. 2 is a diagram illustrated to describe an example of capturing an image capture target to be captured in a case where the image capture target blinks.

FIG. 2 is a diagram illustrated to describe an example of capturing an image capture target to be captured in the case where the image capture target blinks.

Specifically, FIG. 2 illustrates an example of an output image obtained by capturing an LED-based traffic signal serving as a blinking image capture target in the normal mode.

In FIG. 2, the traffic signal in its green phase is captured as an image capture target.

In FIG. 2, in output images of a first frame (Frame 1) and a second frame, the traffic signal on which its green phase (the left end) is on is projected, but in output images of a third frame and a fourth frame, the traffic signal that is turned off is projected.

As described above, the traffic signal projected in the turned-off state causes acceptability as evidence in the event of an accident to be limited in a case where the onboard camera is used as, in one example, a dash cam.

In addition, the traffic signal projected in the turned-off state causes troubles in drive control including stopping of an automobile in the case where the output image obtained by the camera unit is used for, in one example, automatic driving of the automobile.

<Image Capture in Normal Mode During Exposure Time Exceeding Turn-off Period in which Traffic Signal is Turned Off>

Figure 3:
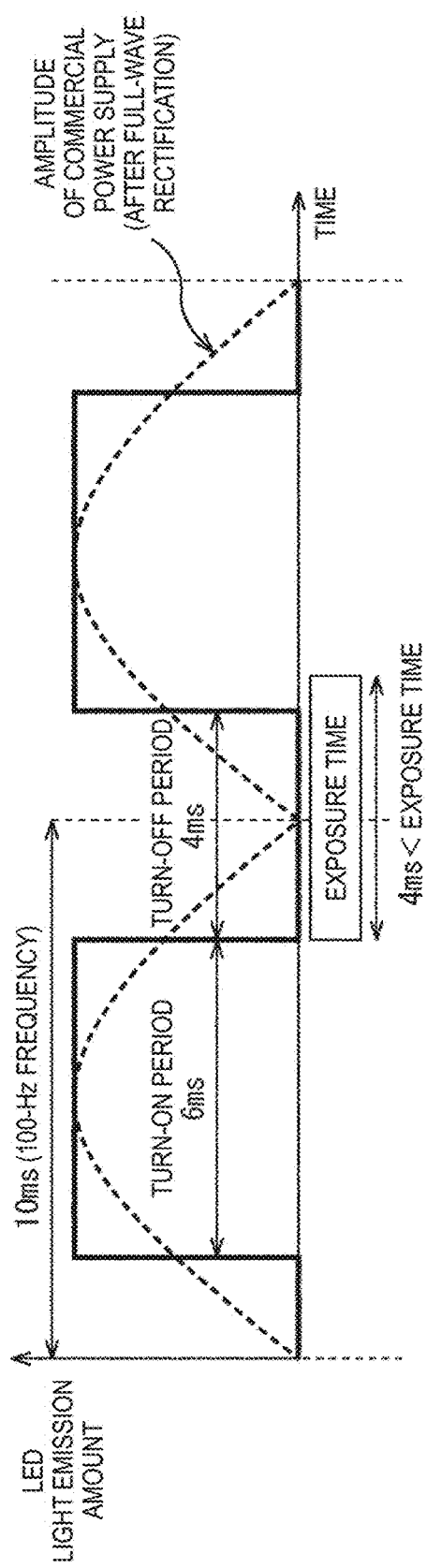
FIG. 3 is a diagram illustrated to describe image capture in a normal mode during an exposure time exceeding a turn-off period in which a traffic signal is turned off.

FIG. 3 is a diagram illustrated to describe image capture in a normal mode during an exposure time exceeding a turn-off period in which the traffic signal is turned off.

In FIG. 3, the horizontal axis represents time, and the vertical axis represents light emission (amount) of LEDs that constitute a traffic signal.

In FIG. 3, in one example, a power supply with a frequency of 100 Hz obtained by full-wave rectifying an AC power supply with a frequency of 50 Hz is used as a power supply of a traffic signal serving as a blinking image capture target.

Thus, the traffic signal blinks at intervals (blinking cycle) of 10 milliseconds (ms) corresponding to 100 Hz.

In FIG. 3, the turn-on duty (Duty) ratio at which the traffic signal is turned on is, in one example, 60% in a 10-ms blinking cycle of the traffic signal.

Thus, a 6 ms period (=100 ms×60%/100) of the 10-ms blinking cycle of the traffic signal is the turn-on period in which the traffic signal is turned on, and the remaining period of 4 ms is the turn-off period in which the traffic signal is turned off.

In the normal mode, if the image capture is performed only within the turn-off period, the captured image obtained by the image capture, that is, the output image is projected in the state where the traffic signal is turned off, as illustrated in FIG. 2.

As described above, in the normal mode, an example of a method of preventing the traffic signal from being projected in the turned-off state includes a method of capturing during the exposure time exceeding the turn-off period in which the traffic signal is turned off.

In FIG. 3, the turn-off time is 4 ms, and so the image capture is performed during an exposure time exceeding 4 ms that is the turn-off period in the normal mode. Thus, at least a part of the exposure time overlaps with the turn-on period, and so it is possible to capture the traffic signal in the turned-on state without fail.

However, there may be a case where the camera unit whose optical system 1 has a fixed f-number, like an onboard camera, is used. In this case, the image capture is typically performed during the exposure time exceeding the turn-off period, the exposure may be excessive under the condition of image capture with high illuminance outdoors or the like in fine weather, which may lead to decrease in visibility of the blinking light source.

In one example, there may be a case where a lens with f-number of 2.0 is used in a certain image sensor. In this case, the traffic signal projected on the captured image (output image) is saturated during the exposure time of 1 ms (a pixel value of the captured image output from the image sensor 2 is the maximum level (saturation level) of possible values).

<Image Capture in High-speed Mode>

Figure 4:
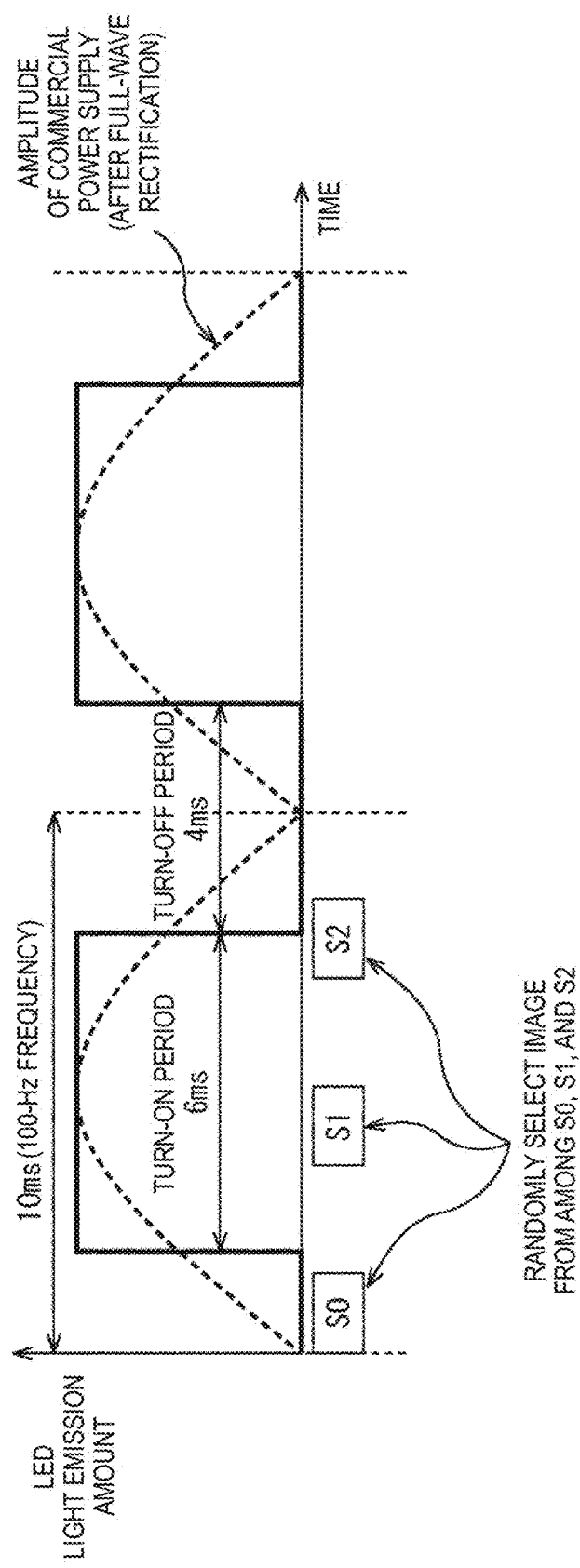
FIG. 4 is a diagram illustrated to describe image capture in a high-speed mode.

FIG. 4 is a diagram illustrated to describe image capture in the high-speed mode.

In FIG. 4, the horizontal axis represents time and the vertical axis represents light emission of LEDs that constitute a traffic signal, which is similar to FIG. 3.

Further, in FIG. 4, a power supply with a frequency of 100 Hz is used as a power supply of a traffic signal serving as a blinking image capture target, and the blinking cycle is 10 ms, which is similar to FIG. 3. Furthermore, in FIG. 4, the turn-on duty ratio is 60%. Of the 10-ms blinking cycle of the traffic signal, a 6-ms (=100 ms×60%/100) period is the turn-on period in which the traffic signal is turned on, and the remaining period of 4 ms is the turn-off period in which the traffic signal is turned off, which is similar to FIG. 3.

In FIG. 4, as an example of the image capture in the high-speed mode, multiple-time image capture, in one example, image capture is performed three times in a period of the frame rate of the output image at a frame rate exceeding the frame rate of the output image (e.g., 30 Hz, 60 Hz, or the like).

Then, for use as an output image, one captured image is selected randomly from among three captured images S0, S1, and S2 obtained by the image capture performed three times.

However, in the case where random selection of one captured image for use as an output image from among the three captured images S0 to S2 is performed, a captured image of the traffic signal projected in the turned-off state is likely to be selected as the output image.

In the case where the output image that is output from the camera unit is used for the automatic driving control of an automobile traveling at high speed, the traffic signal projected on the output image is necessary to be in a turned-on state. Thus, it is undesirable that the captured image of the traffic signal projected in the turned-off state is likely to be selected as the output image.

Further, in the high-speed mode, the traffic signals projected on the three captured images S0 to S2 may be all in the turned-off state.

<Image Capture in New High-speed Mode>

Figure 5:
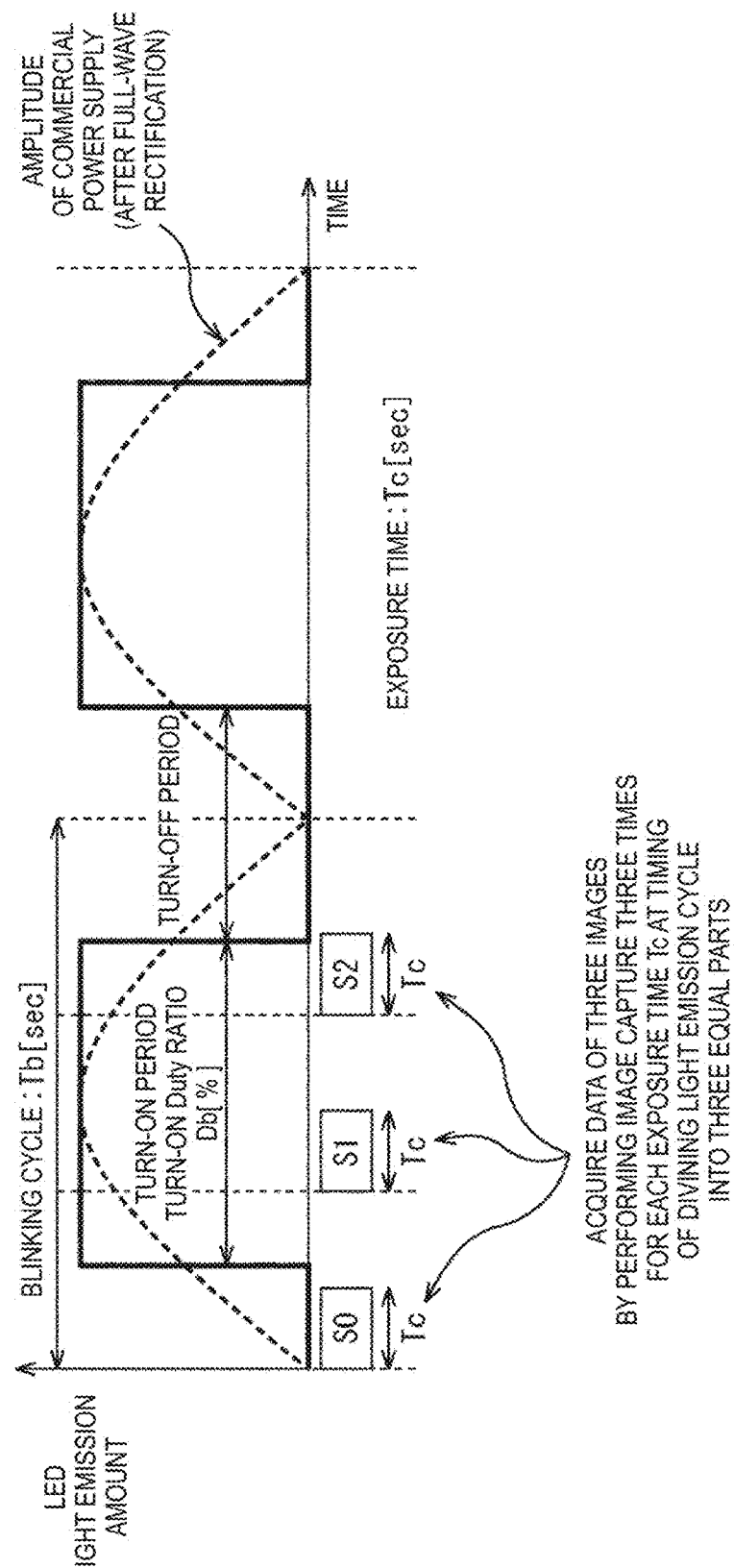
FIG. 5 is a diagram illustrated to describe image capture in a new high-speed mode.

FIG. 5 is a diagram illustrated to describe image capture in the new high-speed mode.

In FIG. 5, the horizontal axis represents time and the vertical axis represents light emission of LEDs that constitute a traffic signal, which is similar to FIG. 3.

In FIG. 5, the cycle of the power supply after the full-wave rectification, that is, the blinking cycle of a traffic signal serving as a blinking image capture target is Tb [sec]. In addition, the turn-on duty ratio of the traffic signal is Db [%].

In this case, the turn-on period of the traffic signal is represented by Tb×Db/100, and the turn-off period is represented by Tb×(1−Db/100).

In the new high-speed mode, as described with reference to FIG. 1, the image capture is performed N times during an exposure time at which at least a part of the turn-on period Tb×Db/100 in which the traffic signal is on overlaps with an exposure time of image capture of at least one time at the timing of dividing the blinking cycle Tb in which the image capture target such as a traffic signal to be captured by the image sensor 2 blinks into N equal parts.

In one example, if image capture is set to be performed three times as the image capture performed N times, the image capture is performed three times at the timing of dividing the blinking cycle Tb into three equal parts in the new high-speed mode.

Here, the exposure time at which at least a part of the turn-on period Tb×Db/100 of the traffic signal in the turned-on state overlaps with an exposure time of image capture of at least one of three times is represented as Tc, and the leading time of the blinking cycle Tb of the traffic signal is set to 0.

In this case, the three captured images S0, S1 and S2 obtained by image capture performed three times have the exposure (image capture) start time of 0, Tb/3, and 2Tb/3, respectively.

In addition, the exposure (image capture) end time of the three captured images S0, S1, and S2 is represented by 0+Tc, Tb/3+Tc, and 2Tb/3+Tc, respectively.

Here, in the new high-speed mode, the lower limit exposure time used to overlap the exposure time Tc of image capture of at least one time with at least a part of the turn-on period Tb×Db/100 is represented as SHT_MIN [sec], and the lower limit exposure time SHT_MIN is represented by a formula SHT_MIN=Tb/N−TbDb/100.

In the case where N is 3, the lower limit exposure time SHT_MIN is expressed by a formula SHT_MIN=Tb/3−TbDb/100.

As the exposure time Tc in the new high-speed mode, a time exceeding the lower limit exposure time SHT_MIN is employed.

In the case where the SHT_MIN obtained by the formula SHT_MIN=Tb/N−TbDb/100 is a negative value, the lower limit exposure time SHT_MIN is set to 0.

In the case where the lower limit exposure time SHT_MIN is set to 0, it is possible to employ any value (positive value) that can be obtained as the exposure time by the camera unit, as the exposure time Tc in the new high-speed mode.

In one example, in a case where the turn-on time Tb is 10 ms and the turn-on duty ratio is 60%, a formula SHT_MIN=Tb/3−TbDb/100=10 ms/3−10 ms×60%/100 is a negative value, and so the lower limit exposure time SHT_MIN is set to 0.

Thus, it is possible to reduce the exposure time Tc to the limit of the camera unit.

In addition, in one example, in a case where the turn-on time Tb is 10 ms and the turn-on duty ratio is 20%, the formula SHT_MIN=Tb/3−TbDb/100=10 ms/3−10 ms×20%/100 is set to 1.33.

Thus, it is possible to set a time, which exceeds the lower limit exposure time SHT_MIN of 1.33 and is larger than or equal to the minimum exposure time that can be supported by the camera unit, as the exposure time Tc.

For the N captured images captured in the new high-speed mode, that is, the N captured images obtained by performing the image capture N times during the exposure time Tc in which at least a part of the turn-on period Tb×Db/100 of the traffic signal in the turned-on state overlaps with the exposure time Tc of image capture of at least one time at the timing of dividing the blinking cycle Tb in which the traffic signal serving as the image capture target blinks into N equal parts.

Thus, a traffic signal that is on should be projected on the at least one captured image among the N captured images captured in the new high-speed mode without fail.

Consequently, it is possible to capture reliably an image capture target such as a blinking traffic signal in the new high-speed mode.

Furthermore, in the new high-speed mode, any time can be set as the exposure time Tc as long as the time exceeds the lower limit exposure time SHT_MIN. Thus, it is possible to perform image capture at appropriate exposure such that the subject projected on the captured image is not saturated or is not too dark.

Here, in the case of capturing N images in the new high-speed mode, if the leading time of the blinking cycle Tb is set to 0, the exposure start time and the exposure end time of the N captured images obtained by capturing the N images are represented as follows, where TC is the exposure time exceeding the lower limit exposure time SHT_MIN.

Specifically, a set of the exposure start time and the exposure end time of the captured image is represented as (exposure start time, exposure end time), as follows:
(exposure start time, exposure end time) of n=first captured image is (0, 0+Tc),
(exposure start time, exposure end time) of n=second captured image is (Tb/N, Tb/N+Tc),
(exposure start time, exposure end time) of n=third captured image is (2Tb/N, 2Tb/N+Tc),
. . .
(exposure start time, exposure end time) of n=k-th captured image is ((K−1)×Tb/N, (k−1)×Tb/N+Tc)
. . .
(exposure start time, exposure end time) of n=N-th captured image is ((N−1)×Tb/N, (N−1)×Tb/N+Tc)

<Processing in the New High-speed Mode>

Figure 6:
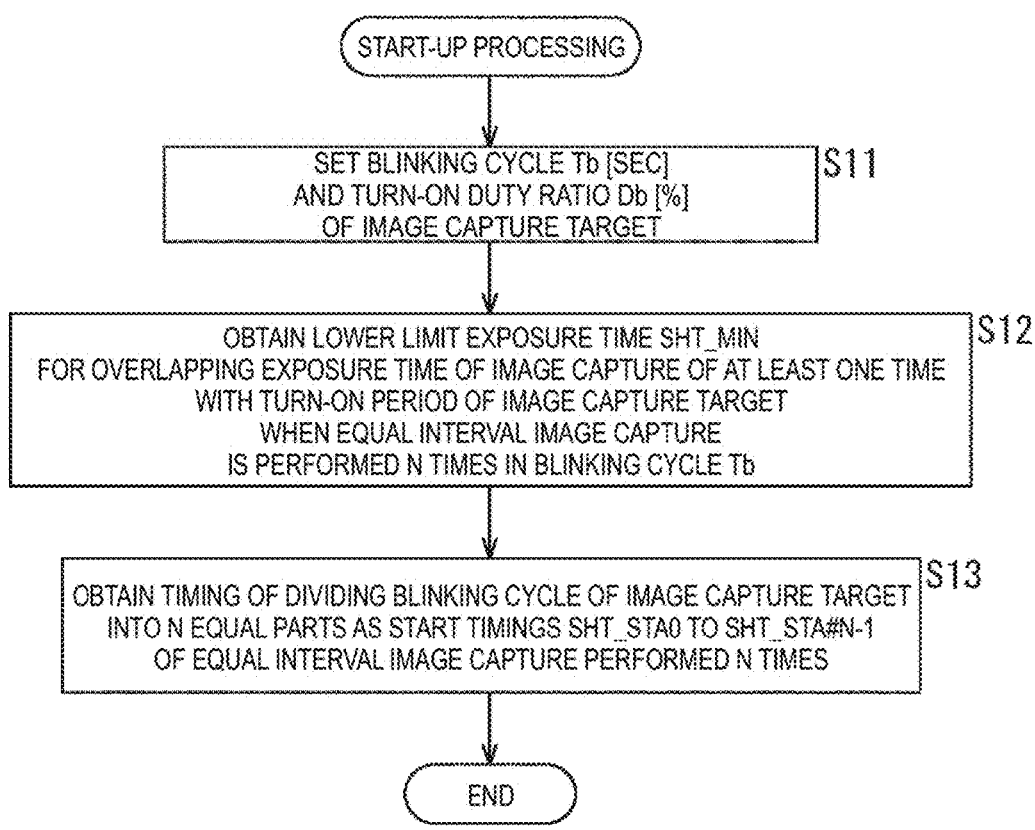
FIG. 6 is a flowchart illustrated to describe an example of start-up processing performed in starting up a camera unit in a new high-speed mode.

FIG. 6 is a flowchart illustrated to describe an example of start-up processing performed at the time of starting up the camera unit in the new high-speed mode.

In step S11, the timing control unit 6 sets the blinking cycle Tb [sec] and the turn-on duty ratio Db [%] of the image capture target intended to be captured by the camera unit, and the processing proceeds to step S12.

Here, the blinking cycle Tb or the turn-on duty ratio Db [%] can be set to, in one example, a default value, a value depending on a user operation, or the like. In a case where the image capture target is a traffic signal or the like, it is possible to set the blinking cycle Tb [sec] and the turn-on duty ratio Db (%) depending on countries, regions, or the like.

In step S12, the timing control unit 6 obtains the lower limit exposure time SHT_MIN used to overlap the exposure time Tc of image capture of at least one time with the turn-on period Tb×Db/100 of the image capture target in the turn-on period Tb when the equal interval image capture (image capture performed N times at the timing of dividing the blinking cycle Tb into N equal parts) is performed N times, as described above with reference to FIG. 5.

Moreover, in one example, the number N of times of image capture is possible to be set in advance or to be set depending on user's operation, or the like.

Then, the processing proceeds from step S12 to step S13. The timing control unit 6 obtains the timing of dividing the blinking cycle Tb of the image capture target into N equal parts as start timings (exposure start time) SHT_STA0, SHT_STA1, . . . , SHT_STA#N−1 of equal interval image capture performed N times in the new high-speed mode, and then terminates the start-up processing.

Figure 7:
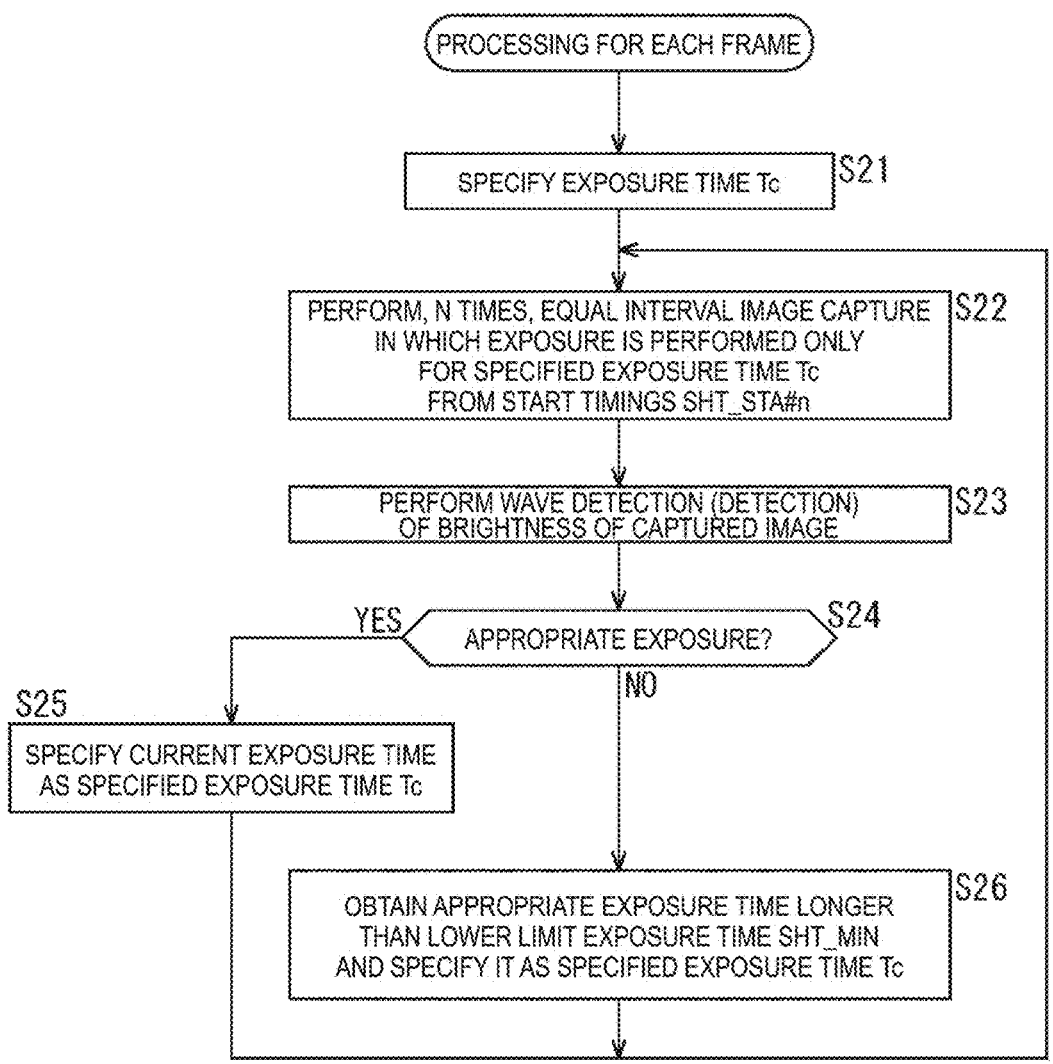
FIG. 7 is a flowchart illustrating an example of processing for each frame which is performed for each frame of an output image in a new high-speed mode.

FIG. 7 is a flowchart illustrated to describe an example of processing for each frame which is performed for each frame of the output image in the new high-speed mode.

In step S21, the timing control unit 6 sets the time that exceeds the lower limit exposure time SHT_MIN obtained by the start-up processing of FIG. 6 as an specified exposure time Tc and specifies the specified exposure time Tc as the exposure time for image capture, then the processing proceeds to step S22.

In step S22, the timing control unit 6 controls the image capture timing of the image sensor 2 so that the equal interval image capture in which exposure is performed N times only for the specified exposure time Tc may be performed by using each of the start timings SHT_STA0, SHT_STA1, . . . , SHT_STA#N−1 obtained by the start-up processing of FIG. 6 as the exposure start time.

This allows the image sensor 2 to perform the equal interval image capture during the specified exposure time Tc in step S22, and the resultant N captured images are supplied to the signal processing unit 4 via the memory 3.

When the N captured images are supplied from the image sensor 2 to the signal processing section 4 via the memory 3, the processing proceeds from step S22 to step S23.

In step S23, the signal processing unit 4 detects (wave detect) the brightness of the N captured images supplied via the memory 3, and the processing proceeds to step S24.

In step S24, the signal processing unit 4 determines whether the current specified exposure time Tc is an exposure time (appropriate exposure time) that is appropriate on the basis of a result obtained by detecting the brightness of the N captured images in step S23.

If it is determined in step S24 that the current specified exposure time Tc is the appropriate exposure time, that is, if the N captured images are neither too bright nor too dark as a whole, the processing proceeds to step S25.

In step S25, the signal processing unit 4 supplies the current exposure time as the specified exposure time Tc to the timing control unit 6. The timing control unit 6 specifies the specified exposure time Tc from the signal processing unit 4 as the exposure time to the image sensor 2.

On the other hand, if it is determined in step S24 that the current specified exposure time Tc is not an appropriate exposure time, that is, if the N captured images are too bright or too dark as a whole, the processing proceeds to step S26.

In step S26, the signal processing unit 4 obtains an appropriate exposure time on the basis of the result obtained by detecting the brightness of the N captured images in step S23, and supplies it to the timing control unit 6. If the appropriate exposure time from the signal processing unit 4 is a time exceeding the lower limit exposure time SHT_MIN, the timing control unit 6 specifies the appropriate exposure time as the specified exposure time Tc to the image sensor 2.

Here, if the appropriate exposure time from the signal processing unit 4 is a time not exceeding the lower limit exposure time SHT_MIN, the timing control unit 6 specifies the minimum exposure time that can be supported by the image sensor 2 among the exposure times larger than the lower limit exposure time SHT_MIN as the specified exposure time Tc to the image sensor 2.

After the processing of step S25 or S26, the processing returns to step S22. In step S22, the equal interval image capture is performed N times during the specified exposure time Tc specified in step S25 or S26, and then the similar processing is repeated thereafter.

<Output Image Generation Processing>

Figure 8:
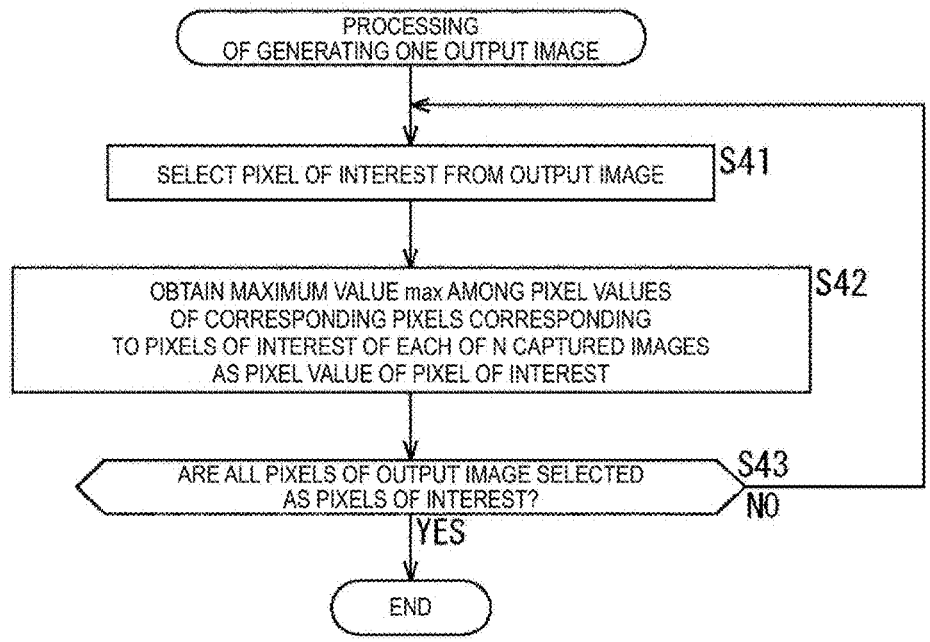
FIG. 8 is a flowchart illustrated to describe a first example of generation processing of generating one output image from N captured images.

FIG. 8 is a flowchart illustrated to describe a first example of generation processing of generating one piece (frame) of output image from the N captured images.

The signal processing unit 4 performs processing on the N captured images obtained by image capture performed N times and generates one output image.

FIG. 8 illustrates a first example of the generation processing performed by the signal processing unit 4.

In the first example of the generation processing, in step S41, the signal processing unit 4 selects one pixel, for example, at the foremost position that is not yet selected as a pixel of interest in the raster scan order, of the output image (intended to be generated from the signal processing unit), and the processing proceeds to step S42.

In step S42, the signal processing unit 4 obtains a maximum value max among pixel values of corresponding pixels (pixels located at the same position as the pixels of interest) corresponding to the pixels of interest of each of the N captured images as the pixel value of the pixel of interest, and the processing proceeds to step S43.

In step S43, the signal processing unit 4 determines whether all the pixels of the output image are selected as the pixels of interest.

If it is determined in step S43 that not yet all the pixels of the output image are selected as the pixels of interest, then the processing returns to step S41 and the similar processing is repeated thereafter.

In addition, if it is determined in step S43 that all the pixels of the output image are selected as the pixels of interest, then the generation processing of generating one output image is terminated.

In the case where the image capture target in the turn-on state is projected on the corresponding captured object whose pixel value is the maximum value max among the corresponding pixels of the N captured images and the maximum value max of among the pixel values of the corresponding pixels of the N captured images is obtained as the pixel value of the output image, it is possible to generate an output image on which the image capture target that is on is projected.

Moreover, as illustrated in FIG. 8, in the case where the maximum value max of the pixel values of the corresponding pixels of the N captured images is obtained as the pixel value of the output image, it is possible to, in the output image, reduce fluctuation in luminance of short cycle appearing as flicker in the captured image.

Figure 9:
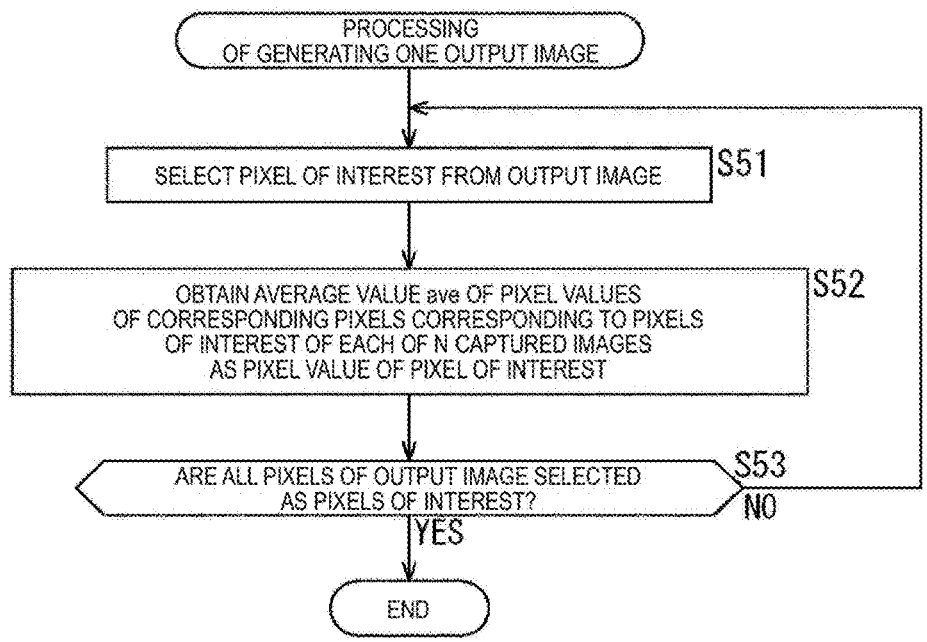
FIG. 9 is a flowchart illustrated to describe a second example of generation processing of generating one output image from N captured images.

FIG. 9 is a flowchart illustrated to describe a second example of generation processing of generating one piece (frame) of output image from the N captured images.

In the second example of the generation processing, in step S51, the signal processing unit 4 selects one pixel of the output image as the pixel of interest, similarly to step S41 of FIG. 8, and the processing proceeds to step S52.

In step S52, the signal processing unit 4 obtains an average value ave of the pixel values of the corresponding pixels corresponding to the pixels of interest of each of the N captured images as the pixel value of the pixel of interest, and then the processing proceeds to step S53. Here, as the average value ave of the pixel values of the corresponding pixels of the N captured images, a simple average or a weighted average of the pixel values of the corresponding pixels can be employed. In the weighted average, in one example, it is possible to assign a large weight to the maximum value max of the pixel values of the corresponding pixels of the N captured images.

In step S53, the signal processing unit 4 determines whether all the pixels of the output image are selected as the pixels of interest.

If it is determined in step S53 that not yet all the pixels of the output image are selected as the pixels of interest, then the processing returns to step S51 and the similar processing is repeated thereafter.

Further, if it is determined in step S53 that all the pixels of the output image are selected as the pixels of interest, then the generation process of generating one output image is terminated.

For the N captured images captured in the new high-speed mode, an image capture target that is on is projected on at least one captured image of them. Thus, as described above, in the case where the average value ave of the pixel values of the corresponding pixels of the N captured images is obtained as the pixel value of the output image, it is possible to generate an output image on which the image capture target that is on is projected.

Moreover, in the case where the average value ave of pixel values of corresponding pixels of the N captured images is obtained as the pixel value of the output image as illustrated in FIG. 9, it is possible to obtain an output image with reduced random noise.

<Example of Output Image>

Figure 10:
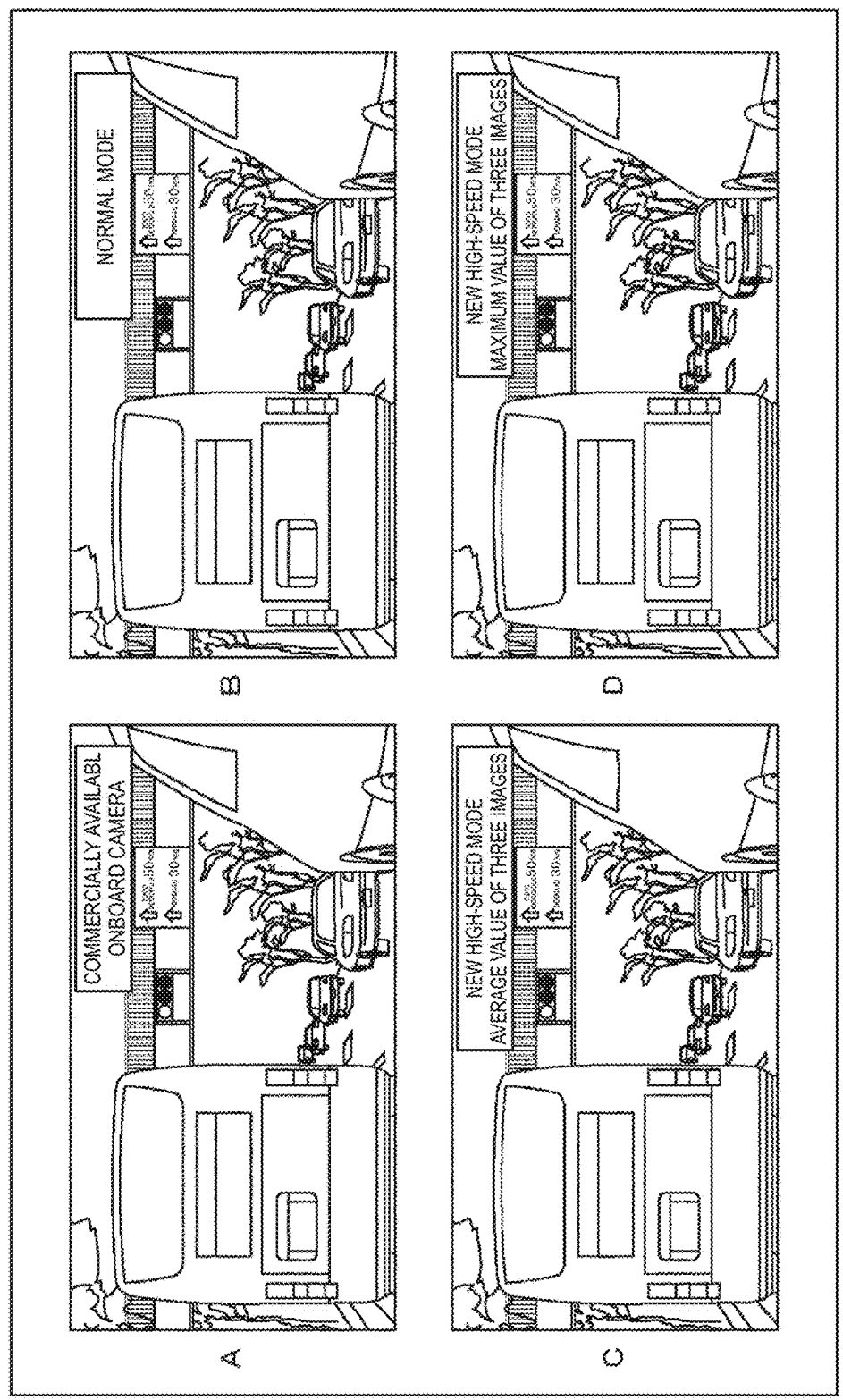
FIG. 10 is a diagram schematically illustrating an example of an output image captured by a commercially available onboard camera, an output image captured in a normal mode, and an output image captured in a new high-speed mode.
Figure 11:
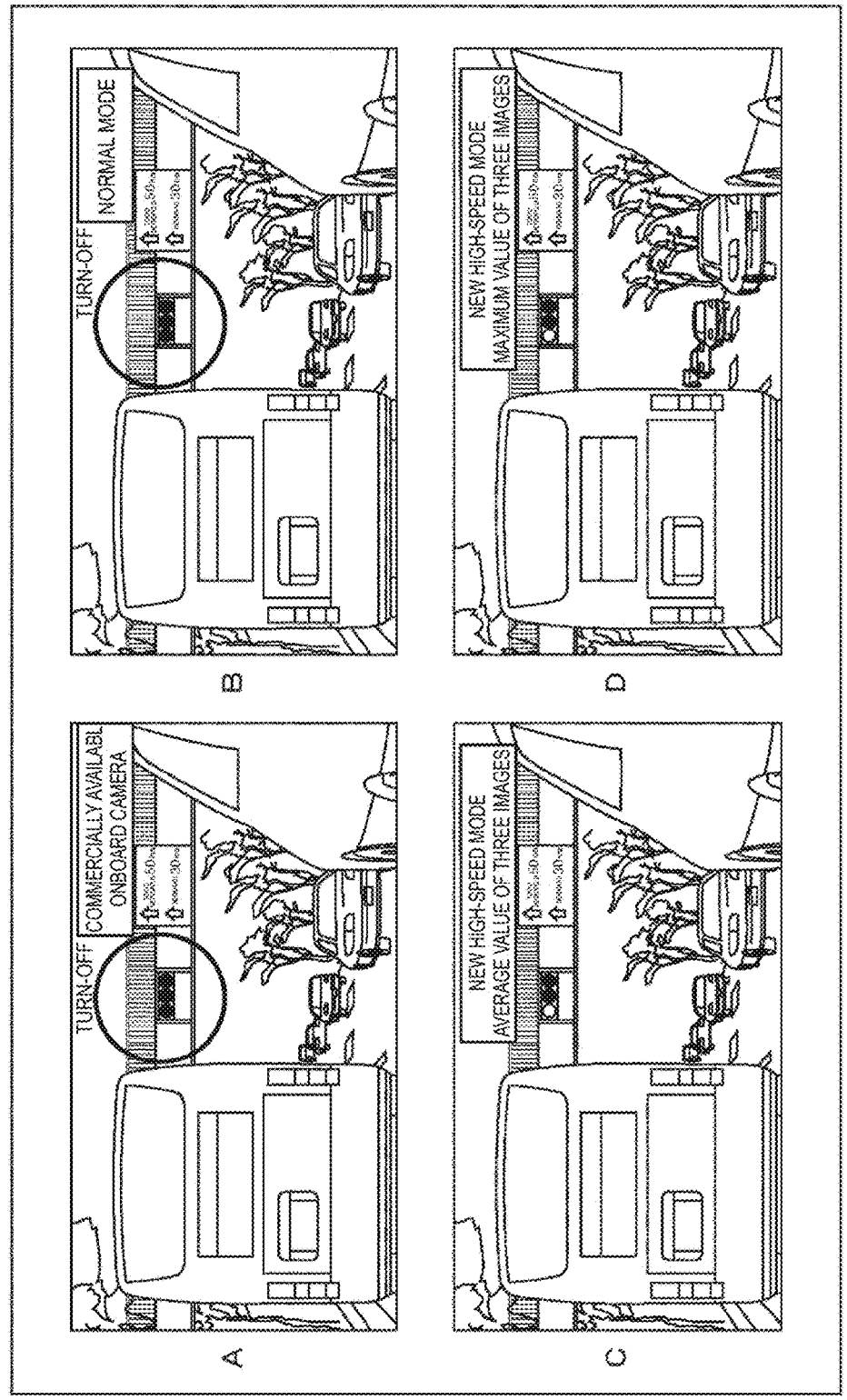
FIG. 11 is a diagram schematically illustrating an example of an output image captured by a commercially available onboard camera, an output image captured in a normal mode, and an output image captured in a new high-speed mode.
Figure 12:
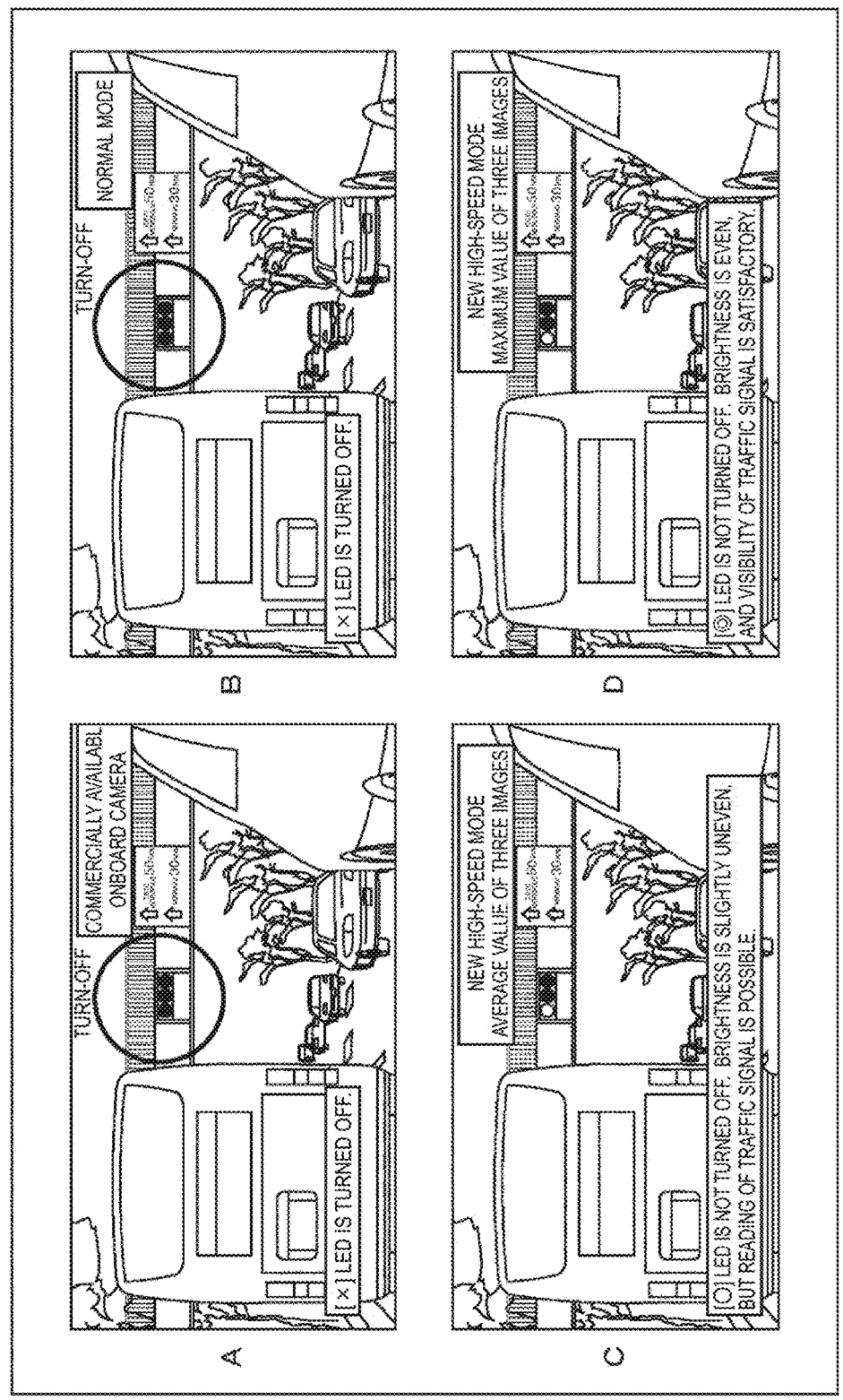
FIG. 12 is a diagram schematically illustrating an example of an output image captured by a commercially available onboard camera, an output image captured in a normal mode, and an output image captured in a new high-speed mode.

FIGS. 10, 11, and 12 are diagrams schematically illustrating examples of an output image captured by a commercially available onboard camera, an output image captured in the normal mode, and an output image captured in the new high-speed mode.

In other words, FIGS. 10 to 12 illustrate output images of different frames.

Further, FIG. 10 to the portion A of FIG. 12 illustrate an output image in a case where a captured image that is captured by a commercially available onboard camera is used as the output image without modification.

FIG. 10 to the portion B of FIG. 12 illustrate an output image in a case where the captured image that is captured in the normal mode is used as the output image without modification.

FIG. 10 to the portion C of FIG. 12 illustrate an output image in a case where the average value ave of the pixel values of the corresponding pixels of the three captured images that is captured in the new high-speed mode is used as the pixel value of the output image.

FIG. 10 to the portion D of FIG. 12 illustrate an output image in a case where the maximum value max of the pixel values of the corresponding pixels of the three captured images that is captured in the new high-speed mode is used as the pixel value of the output image.

In the frame illustrated in FIG. 10, a traffic signal that is turned to green (left end) is projected on all of the output image captured by a commercially available onboard camera, the output image captured in the normal mode, and the output image captured in the new high-speed mode.

However, in the frames illustrated in FIGS. 11 and 12, the traffic signal projected on the output image captured in the new high-speed mode is on, but the traffic signals projected on the output image captured by the commercially available onboard camera and the output image captured in the normal mode are all turned off.

Moreover, the inventors have found that, in the case where a traffic signal is captured during the daytime, the output image with the maximum value max (among the pixel values of the corresponding pixels of the three captured images) as the pixel value has higher visibility of the traffic signal than the output image with the average value ave as the pixel value.

<Application Example of New High-speed Mode>

Figure 13:
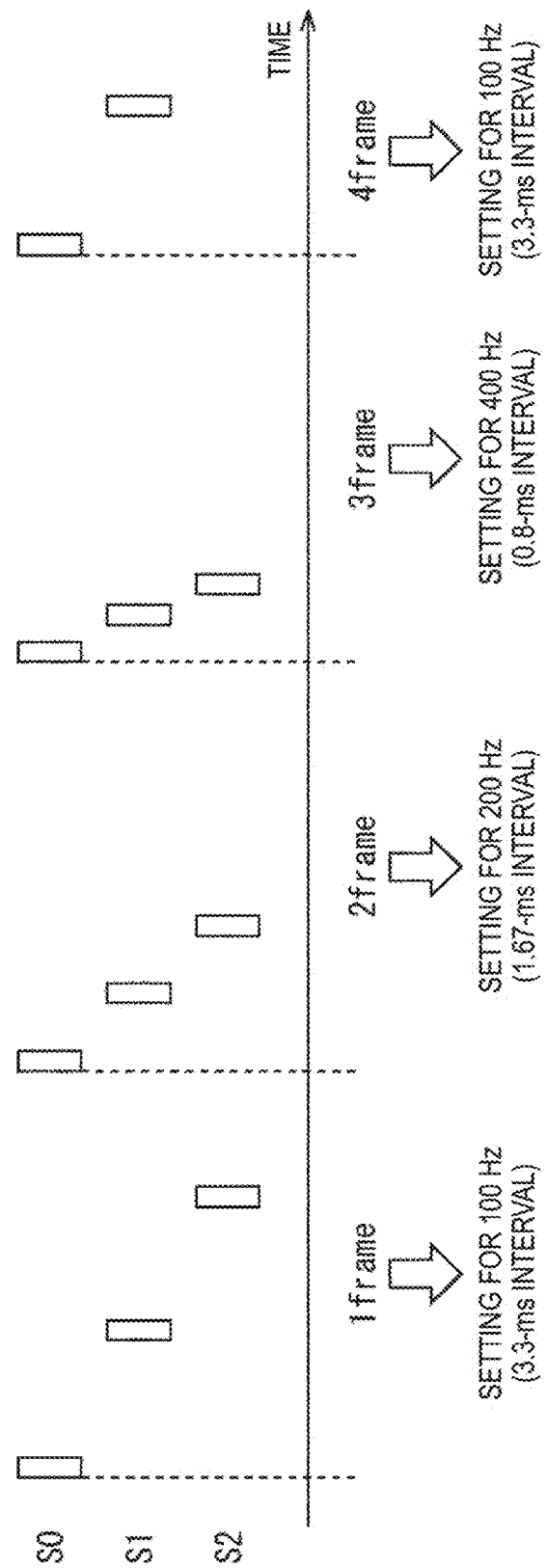
FIG. 13 is a diagram illustrated to describe a first application example of a new high-speed mode.

FIG. 13 is a diagram illustrated to describe a first application example of the new high-speed mode.

In the new high-speed mode, the timing control unit 6 controls the image capture timing of the image sensor 2, and thus it is possible to fix the blinking cycle Tb of the image capture target in each frame of the output image to one cycle and to perform the equal interval image capture N times with respect to the one blinking cycle Tb.

Further, in the new high-speed mode, the timing control unit 6 controls the image capture timing of the image sensor 2, and thus it is possible to perform the equal interval image capture N times with respect to different blinking cycles Tb every frame or frames of the output image.

FIG. 13 illustrates an example in which equal interval image capture is performed N times with respect to different blinking cycles Tb for each frame of the output image in the new high-speed mode.

In FIG. 13, the equal interval image capture is performed with respect to the blinking cycle Tb=1/100 seconds in the first frame of the output image, the blinking cycle Tb=1/200 seconds in the second frame, and the third blinking cycle Tb=1/400 seconds in the third frame by setting the number N of times of equal interval image capture to three.

Then, in the fourth and subsequent frames of the output image, the equal interval image capture in which the blinking cycle Tb is set to 1/100, 1/200, and 1/400 seconds is sequentially repeated.

In equal interval image capture performed three times, in the case where the blinking cycle Tb=1/100 seconds, three captured images are captured at intervals of 10/3 ms (about 3.3 ms). In addition, in the case where the blinking cycle Tb=1/200 seconds, the three captured images are captured at intervals of 5/3 ms (about 1.67 ms), and in the case where the blinking cycle Tb is 1/400 seconds, three captured images is captured at intervals of 2.5/3 ms (about 0.8 ms).

As described above, in the case where the equal interval image capture is performed N times with respect to different blinking cycles Tb for each frame of the output image, it is possible to capture different image capture targets blinking at different blinking cycle Tb in the turned-on state.

Figure 14:
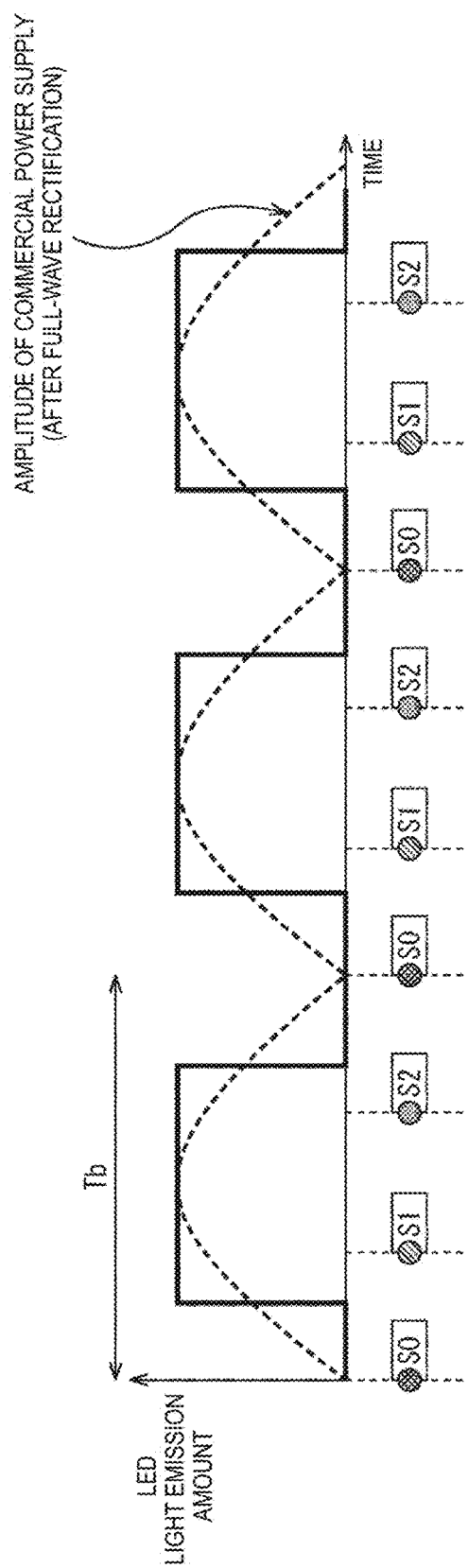
FIG. 14 is a diagram illustrated to describe a second application example of a new high-speed mode.
Figure 15:
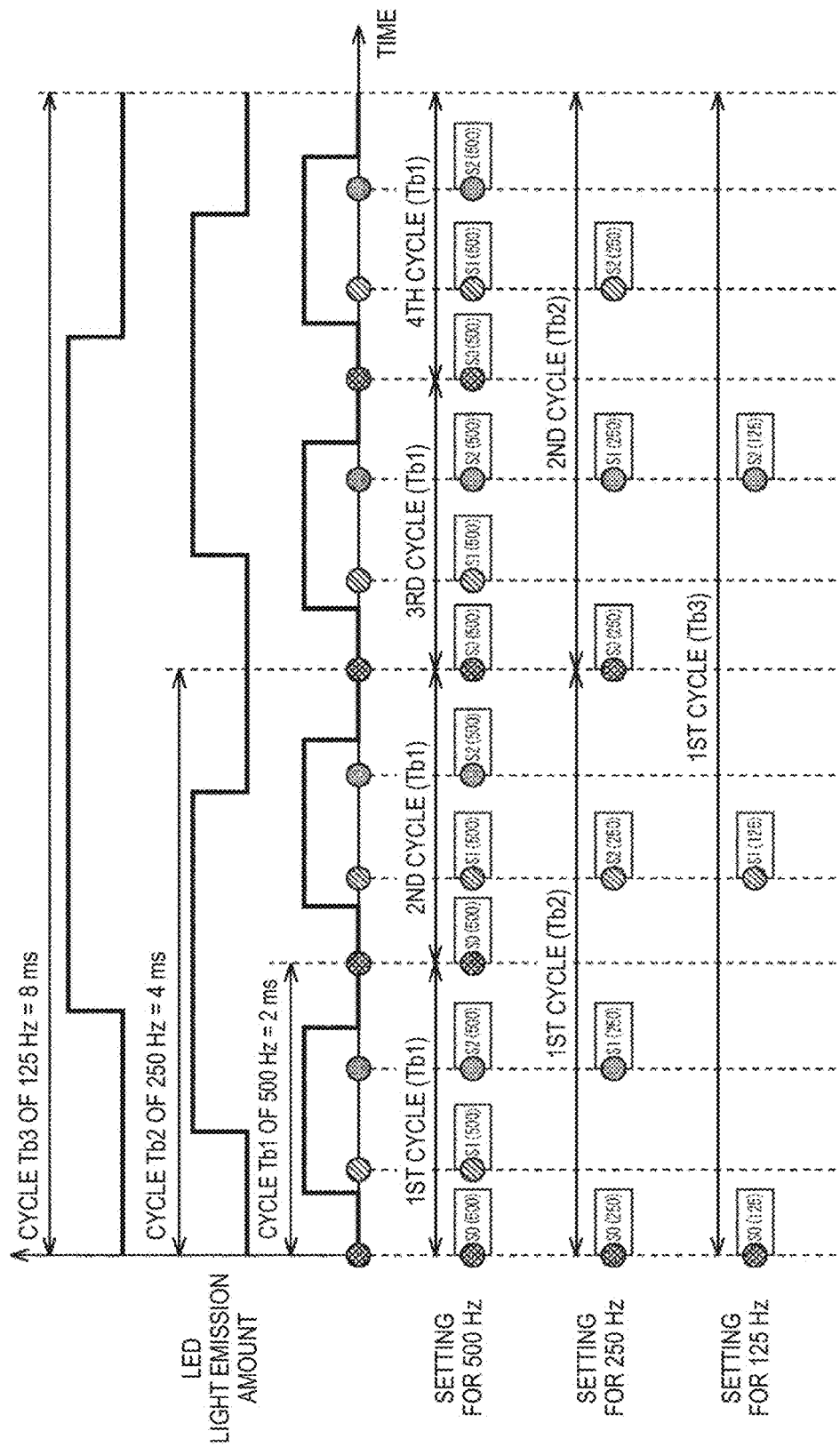
FIG. 15 is a diagram illustrated to describe a second application example of a new high-speed mode.

FIGS. 14 and 15 are diagrams illustrated to describe a second application example of the new high-speed mode.

FIG. 14 illustrates how to capture the image capture target with the blinking cycle blinking at Tb in the new high-speed mode by equal interval image capture performed three times.

In FIG. 14, image capture is performed three times at the timing of dividing the blinking cycle Tb into three equal parts, and three captured images S0, S1 and S2 are obtained.

The timing of capturing the three captured images S0 to S2 (the image capture start timing) is uniquely determined by the blinking cycle Tb.

Thus, in the case where equal interval image capture is performed N times with respect to different blinking cycles Tb, the equal interval image capture performed N times is basically necessary to be performed with respect to the different blinking cycles Tb every frame or frames of the output image as described with reference to FIG. 13.

However, in a case where the different blinking cycles Tb are in a specific relationship, it is possible to simultaneously perform the equal interval image capture N times with respect to the different blinking cycles Tb in one frame of the output image.

FIG. 15 illustrates how to perform simultaneously the equal interval image capture N times with respect to the different blinking cycles Tb in a specific relationship in one frame of the output image.

In a case where a blinking cycle Tb_A of one image capture target (a first image capture target) is a cycle that is a power of two of a blinking cycle Tb_B of another image capture target (a second image capture target), the blinking cycle Tb_A is subject to the equal interval image capture N times. This makes it possible to perform equal interval image capture N times with respect to both the blinking cycles Tb_A and Tb_B in one frame of the output image.

Specifically, FIG. 15 illustrates three different blinking cycles Tb1, Tb2, and Tb3, which are 2 ms of a cycle corresponding to 500 Hz, 4 ms of a cycle corresponding to 250 Hz, and 8 ms of a cycle corresponding to 125 Hz, respectively.

Further, FIG. 15 illustrates three captured images which are obtained by setting the number N of times equal interval image capture is performed to three and performing equal interval image capture three times with respect to the blinking cycle Tb1 of 2 ms (500 Hz) are represented by S0 (500), S1 (500), and S2 (500).

Similarly, FIG. 15 illustrates three captured images S0 (250), S1 (250), and S2 (250), which are obtained by performing equal interval image capture three times with respect to the blinking cycle Tb2 of 4 ms (250 Hz). In addition, FIG. 15 illustrates three captured images S0 (125), S1 (125), and S2 (150), which are obtained by performing equal interval image capture three times with respect to the blinking cycle Tb3 of 8 ms (125 Hz).

The blinking cycle Tb3=8 ms is a cycle that is a power of two for both the blinking cycles Tb1=2 ms and Tb2=4 ms.

In this case, the timing at which any one of the three captured images S0 (125), S1 (125), and S2 (125) is captured with respect to the blinking cycle Tb3=8 ms coincides with the timing at which any one of the three captured images S0 (500), S1 (500), and S2 (500) is captured with respect to the blinking cycle Tb1=2 ms.

Specifically, as illustrated in FIG. 15, one cycle of the blinking cycle Tb3=8 ms corresponds to four cycles of the blinking cycle Tb1=2 ms. The timing at which the first captured image S0 (125) in the first cycle of the blinking cycle Tb3=8 ms is captured coincides with the timing at which the first captured image S0 (500) in the first cycle of the blinking cycle Tb1=2 ms is captured. Furthermore, the timing at which the second captured image S1 (125) in the first cycle of the blinking cycle Tb3=8 ms is captured coincides with the timing at which the second captured image S1 (500) in the second cycle of the blinking cycle Tb1=2 ms is captured. In addition, the timing at which the third captured image S2 (125) in the first cycle of the blinking cycle Tb3=8 ms is captured coincides with the timing at which the third captured image S2 (500) in the third cycle with the blinking cycle Tb1=2 ms is captured.

Thus, in the case of capturing the three captured images S0 (125), S1 (125), and S2 (125) with respect to the blinking cycle Tb3=8 ms, it is possible to use the three captured images S0 (125), S1 (125), and S2 (125) as three captured images S0 (500), S1 (500), and S2 (500), respectively, with respect to the blinking cycle Tb1=2 ms.

Similarly, the timing at which any one of the three captured images S0 (125), S1 (125), and S2 (125) is captured with respect to the blinking cycle Tb3=8 ms coincides with the timing at which the timing at which any one of the three captured images S0 (250), S1 (250), and S2 (250) is captured with respect to the blinking cycle Tb2=4 ms.

Specifically, as illustrated in FIG. 15, one cycle of the blinking cycle Tb3=8 ms corresponds to two cycles of the blinking cycle Tb2=4 ms. The timing at which the first captured image S0 (125) in the first cycle of the blinking cycle Tb3=8 ms is captured coincides with the timing at which the first captured image S0 (250) in the first cycle of the blinking cycle Tb2=4 ms is captured. Furthermore, the timing at which the second captured image S1 (125) in the first cycle of the blinking cycle Tb3=8 ms is captured coincides with the timing at which the third captured image S2 (250) in the first cycle of the blinking cycle Tb2=4 ms is captured. In addition, the timing at which the third captured image S2 (125) in the first cycle of the blinking cycle Tb3=8 ms is captured coincides with the timing at which the second captured image S1 (250) in the second cycle with the blinking cycle Tb2=4 ms is captured.

Thus, in the case of capturing the three captured images S0 (125), S1 (125), and S2 (125) with respect to the blinking cycle Tb3=8 ms, it is possible to use the three captured images S0 (125), S1 (125), and S2 (125) as three captured images S0 (250), S1 (250), and S2 (250), respectively, with respect to the blinking cycle Tb2=4 ms.

From the above description, in the case of performing the equal interval image capture with respect to a certain blinking cycle Tb, the blinking cycle $2^M \times Tb$ of the M-th power of 2 (M is an integer ≥0) of the blinking cycle Tb, and the camera module performs the equal interval image capture with respect to the maximum blinking cycle $2^{M'} \times Tb$ (M' is an integer ≥0) capable of perform the equal interval image capture N times, and so it is possible to perform the equal interval image captures with respect to M' blinking cycles of $2^0 \times Tb, 2^1 \times Tb, 2^2 \times Tb, \ldots, 2^{M'} \times Tb$ simultaneously in one frame of the output image.

<Application of Generation Processing to Preventive Measures Against Flicker>

Figure 16:
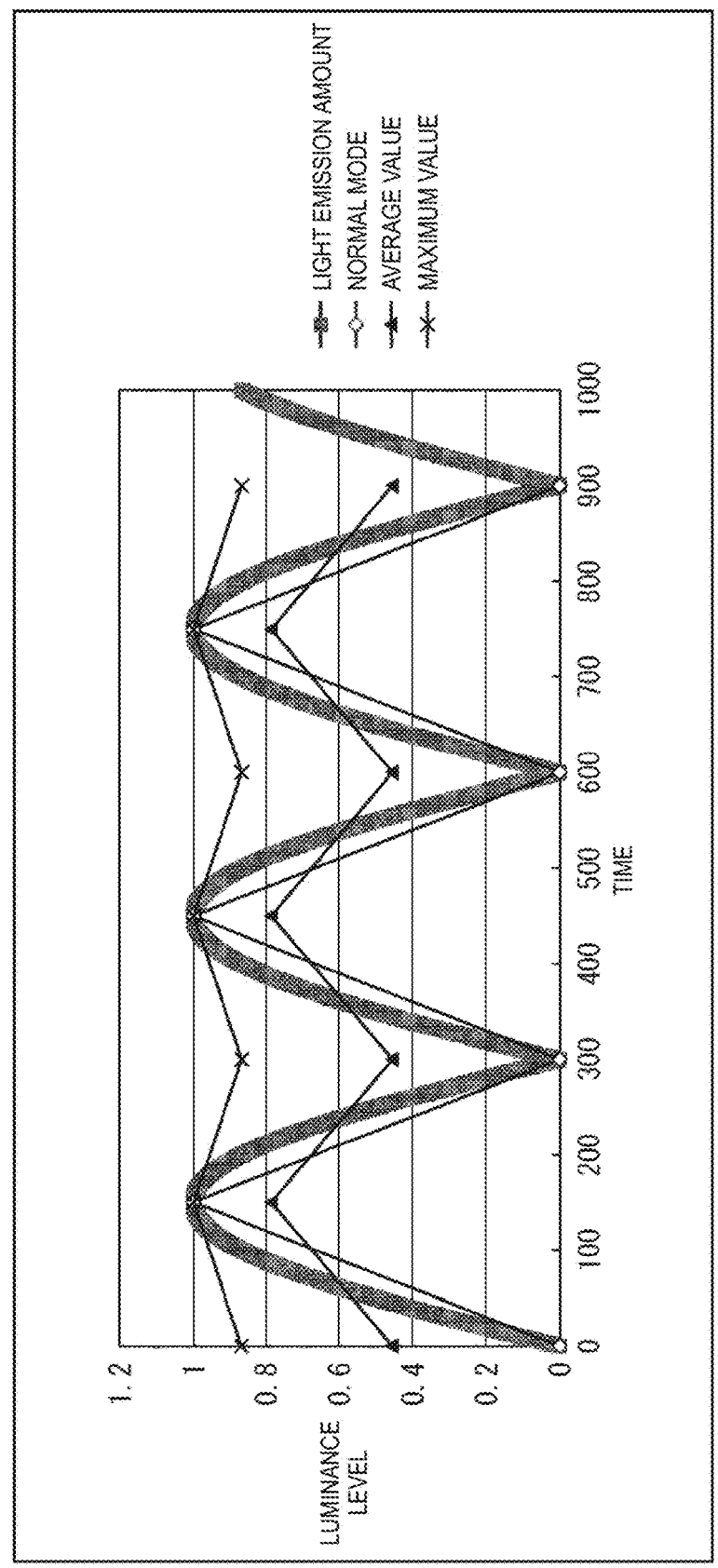
FIG. 16 is a diagram illustrated to describe application of preventive measures against flicker caused in generation processing of generating an output image, which is performed by a signal processing unit 4.

FIG. 16 is a diagram illustrated to describe the application of the generation processing of generating the output image performed by the signal processing unit 4 for preventive measures against flicker.

Specifically, FIG. 16 schematically illustrates the light emission amount of a blinking image capture target and a change in luminance with time of the output image obtained by capturing the image capture target in the normal mode and the new high-speed mode.

In the normal mode, one captured image is captured during the period of one frame of the output image, and the captured image is output as an output image. Thus, the luminance of the output image obtained in the normal mode varies depending on the light emission amount of the blinking image capture target. This change in luminance is observed as flicker.

On the other hand, in the new high-speed mode, N captured images are captured at equal intervals during the period of one frame of the output image. Then, in the generation processing, the maximum value max or the average value ave of the pixel values of the corresponding pixels of the N captured images is obtained as the pixel value of the output image.

If the output image having the maximum value max or the average value ave of the pixel values of the corresponding pixels of the N captured images as the pixel value are set as the output image with the maximum value max or the output images with the average value ave, the output image with the maximum value max or the output image with the average value ave has variation in luminance that is less than that of the output image obtained in the normal mode, as illustrated in FIG. 15.

Specifically, in the output image with the maximum value max and the output image with the average value ave, flicker (fluctuation in short-cycle luminance) is reduced. Thus, it is possible to use the processing of generating the output image performed by the signal processing unit 4 to reduce flicker.

In FIG. 16, it can be found that the output image with the maximum value max has more reduced flicker in a case where the output image with the maximum value max is compared to the output image with the average value ave.

Moreover, in the new high-speed mode, it is possible to measure the blinking cycle Tb of the image capture target and to perform the equal interval image capture N times with respect to the measured blinking cycle Tb.

Further, in the camera unit, it is possible to replace a frame to be captured in the new high-speed mode and a frame to be captured in the normal mode with each other every frame or frames. In this case, it is possible to improve visibility of the output image.

Furthermore, in the camera unit, it is possible to change seamlessly between the new high-speed mode and the normal mode. An example of a method of changing seamlessly between the new high-speed mode and the normal mode includes, in one example, a method of gradually increasing or decreasing the number of time N of the equal interval image capture in the new high-speed mode.

In addition, the new high-speed mode is applicable to all the pixels (not illustrated) that constitute the image sensor 2, or is applicable to only a part of the pixels. In one example, it is possible to apply the new high-speed mode to the pixels in the central part of the pixels that constitute the image sensor 2 and to apply the normal mode to its peripheral pixels.

Furthermore, in the new high-speed mode, as an image capture target, it is possible to employ LED-based traffic signals, traffic signs, and other objects that blink at a regular frequency (cycle).

<Another Example of Output Image Generation Processing>

Figure 17:
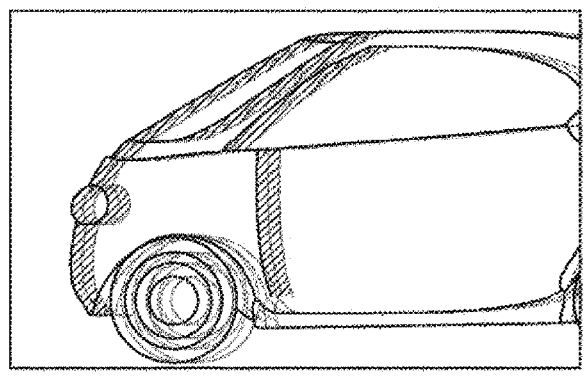
FIG. 17 is a diagram illustrating an example of an output image in which false color occurs.

FIG. 17 is a diagram illustrating an example of an output image in which false color occurs.

In the output image generation processing, in a case of generating an output image with the average value ave, specifically, an output image obtained by setting the average value ave of the pixel values of corresponding pixels of the N captured images as a pixel value, when a moving object (moving body) is projected on the output image, false color may occur in the motion blur of the moving object.

Specifically, in a case where any of the corresponding pixels of the N captured images used for generation of the output image with the average value ave is saturated, if the WB gain for WB adjustment is applied to the output image with the average value ave in the signal processing unit 4, false color occurs in the motion blurring portion of the moving object projected on the output image with the average value ave.

In one example, assume that the value of R (Red), G (Green), and B (Blue) as the pixel values of the captured image is represented as (R, G, B), WB gain is represented as (Gr, Gg, Gb), and the pixel value after WB gain is applied is represented as (R', G', B').

The pixel value (R', G', B') after WB gain is applied is expressed by the following equation.

$$R' = \text{MIN}(MM, R \times Gr)$$

$$G' = \text{MIN}(MM, G \times Gg)$$

$$B' = \text{MIN}(MM, B \times Gb)$$

Where, MIN (A, B) represents the smaller one of A and B.

In a case where the pixel value (R, G, B) of the captured image is saturated, specifically, the pixel value (R, G, B) is (MM, MM, MM) as saturated white (MM is a maximum value that can obtain as a pixel value), the pixel value (R', G', B') obtained by applying WB gain (Gr, Gg, Gb) to the pixel value (R, G, B)=(MM, MM, MM) remain as (MM, MM, MM).

On the other hand, in a case where the pixel value (R, G, B) of the captured image is (0, 0, 0) as black, the pixel value (R', G', B') obtained by applying the WB gain (Gr, Gg, Gb) to the pixel value (R, G, B)=(0, 0, 0) remain as (0, 0, 0).

Thus, in a case where the pixel value (R, G, B) of the corresponding pixel of one captured image is (MM, MM, MM) and the pixel value (R, G, B) of the corresponding pixel of another captured image is (0, 0, 0), the average value ave which is the pixel value of the pixel of interest of the output image is (MM/2, MM/2, MM/2).

Furthermore, the pixel value (R', G', B') obtained by applying WB gain (Gr, Gg, Gb) to the pixel value (MM/2, MM/2, MM/2) of the pixel of interest of the output image is (Gr, Gg, Gb)×MM/2.

Thus, in one example, assuming that there is a relationship represented by a formula Gg<Gr≈Gb (where Gg<2) to the WB gain (Gr, Gg, Gb), the pixel value (R', G', B')=(Gr×MM/2, Gg×MM/2, Gb×MM/2) obtained by applying the WB gain (Gr, Gg, Gb) to the average value ave (=(MM/2, MM/2, MM/2)) between the pixel value (R, G, B)=(MM, MM, MM) as saturated white and the pixel value (R, G, B)=(0, 0, 0) as black is purple which does not exist in the captured image.

In other words, purple false color occurs in the output image having the average value ave.

FIG. 17 illustrates an example of an output image in which an average value ave of pixel values of corresponding pixels of three captured images is used as a pixel value, and purple false color occurs in the portion indicated by hatching in the figure.

Specifically, a white car as a moving object moving from right to left is projected on the three captured images. Furthermore, the pixel value (R, G, B) of the corresponding pixel of the first one of the three captured images is (0, 0, 0) as black, but the pixel value (R, G, B) of the corresponding pixel of the second one is (M, M, M) as saturated white.

In the case of simply averaging the pixel values of corresponding pixels as described above and of applying the WB gain to the resultant average value ave, false color occurs as indicated by hatching in FIG. 17.

Moreover, in this case, the pixel value has three values of R, G, and B. However, even in the case where the image sensor 2 is an image sensor such as a Bayer array and the pixel value is RAW data of only one color of R, G, and B, false color occurs similarly.

In the corresponding pixel in the saturated state, in a case where the WB is collapsed before the WB gain is applied and the averaging is performed between the pixel value of the corresponding pixel in the saturated state in which WB is collapsed and the pixel value of the corresponding pixel in which the WB is not collapsed (not in the saturated state), the WB of the average value ave obtained by the averaging changes.

As described above, this change in the WB with the average value ave is a reason why false color occurs.

An example of a method of reducing the false color as described above includes a method of employing, as the pixel value of the output image (pixel of interest), the maximum value max of the pixel values of the corresponding pixels of the N captured images instead of the average value ave using the pixel value of the corresponding pixel in the case where the corresponding pixel is in the saturated state in the generation processing.

Figure 18:
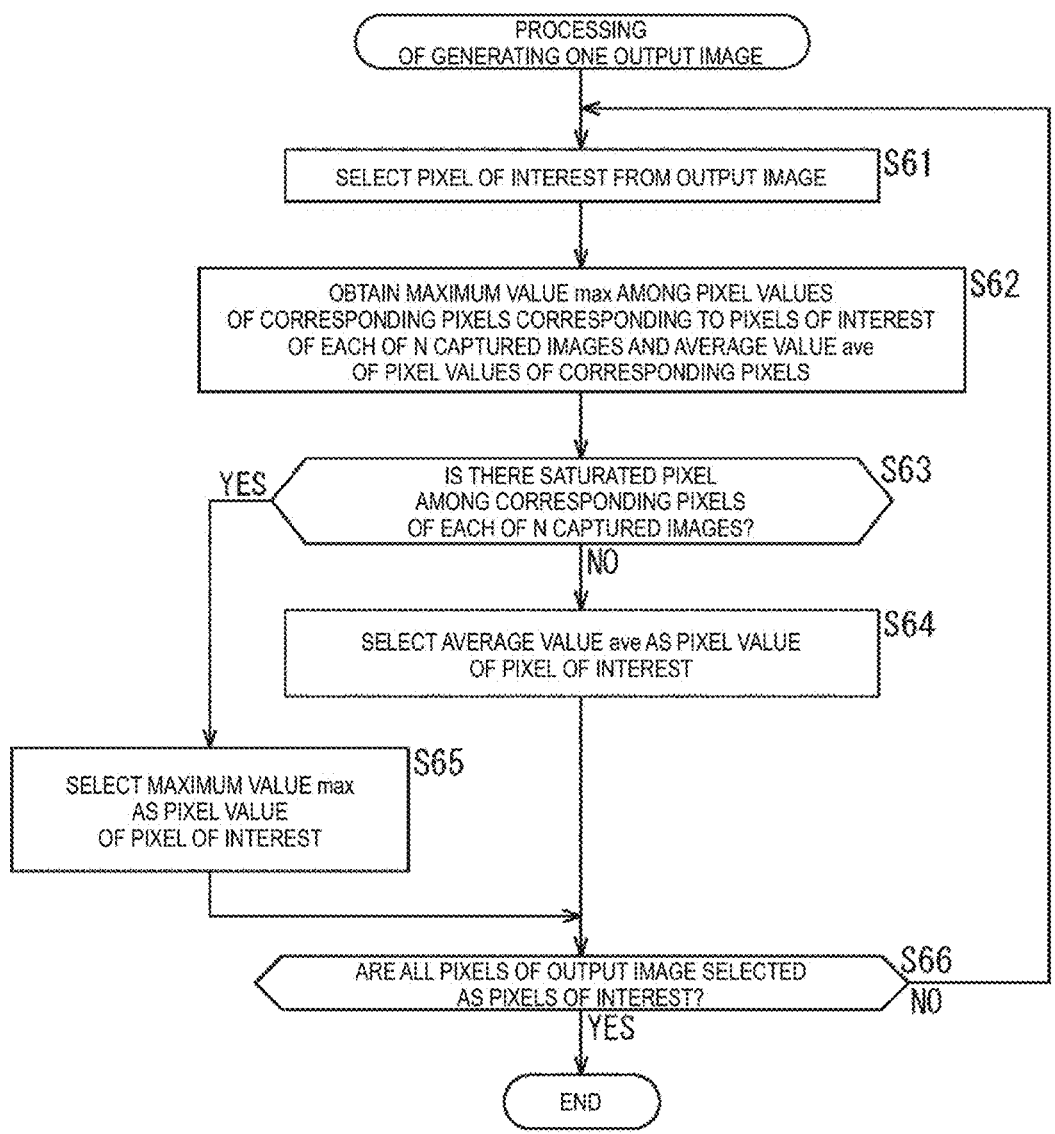
FIG. 18 is a flowchart illustrated to describe a third example of generation processing of generating one output image from N captured images.

FIG. 18 is a flowchart illustrated to describe a third example of generation processing of generating one piece (frame) of output image from N captured images.

Specifically, FIG. 18 is a flowchart illustrated to describe an example of the generation processing in which the average value ave is employed as the pixel value of the output image in the case where the corresponding pixel is not in the saturated state, and the maximum value max is employed as the pixel value of the output image in the case where the corresponding pixel is in the saturated state.

In the third example of the generation process, in step S61, the signal processing unit 4 selects one pixel of the output image as a pixel of interest, which is similar to step S41 of FIG. 8, and then the processing proceeds to step S62.

In step S62, the signal processing unit 4 obtains the maximum value max and the average value ave of pixel values of corresponding pixels that correspond to pixels of interest of each of the N captured images, and then the processing proceeds to step S63.

In step S63, the signal processing unit 4 determines whether there is a saturated pixel in the saturated state among the corresponding pixels of the N captured images.

If it is determined in step S63 that there is no saturated pixel among the corresponding pixels of the N captured images, that is, the corresponding pixel with the maximum value max among the corresponding pixels of the N captured images is not saturated, the processing proceeds to step S64.

In step S64, the signal processing unit 4 selects the average value ave obtained in step S62 as the pixel value of the pixel of interest, and then the processing proceeds to step S66.

If it is determined in step S63 that there is a saturated pixel in the corresponding pixels of the N captured images, that is, the corresponding pixel with the maximum value max of the corresponding pixels of the N captured images is saturated, the processing proceeds to step S65.

In step S65, the signal processing unit 4 selects the maximum value max (pixel value of the saturated pixel) obtained in step S62 as the pixel value of the pixel of interest, and then the processing proceeds to step S66.

In step S66, the signal processing unit 4 determines whether all the pixels of the output image are selected as the pixels of interest.

If it is determined in step S66 that not yet all the pixels of the output image are selected as the pixels of interest, the processing returns to step S61 and the similar processing is repeated thereafter.

In addition, if it is determined in step S66 that all the pixels of the output image are selected as the pixels of interest, then the generation processing of generating one output image is terminated.

As described above, when the maximum value max among the pixel values of the corresponding pixels of the N captured images is saturated, the maximum value max is obtained as the pixel value of the pixel of interest of the output image, and when none of the pixel values of the corresponding pixels of the N captured images are saturated, the average value ave of the pixel values of the corresponding pixels of the N captured images is obtained as the pixel value of the pixel of interest of the output image, and so it is possible to prevent false color as described in FIG. 17 from occurring in the output image.

By the way, in the third example of the generation processing in FIG. 18, the average value ave or the maximum value max of the corresponding pixels of the captured image is selected as the pixel value of the output image depending on whether the corresponding pixel of the captured image is a saturated pixel.

In this case, a difference in level may occur suddenly in the portion where the pixel values gradually change in the output image.

Figure 19:
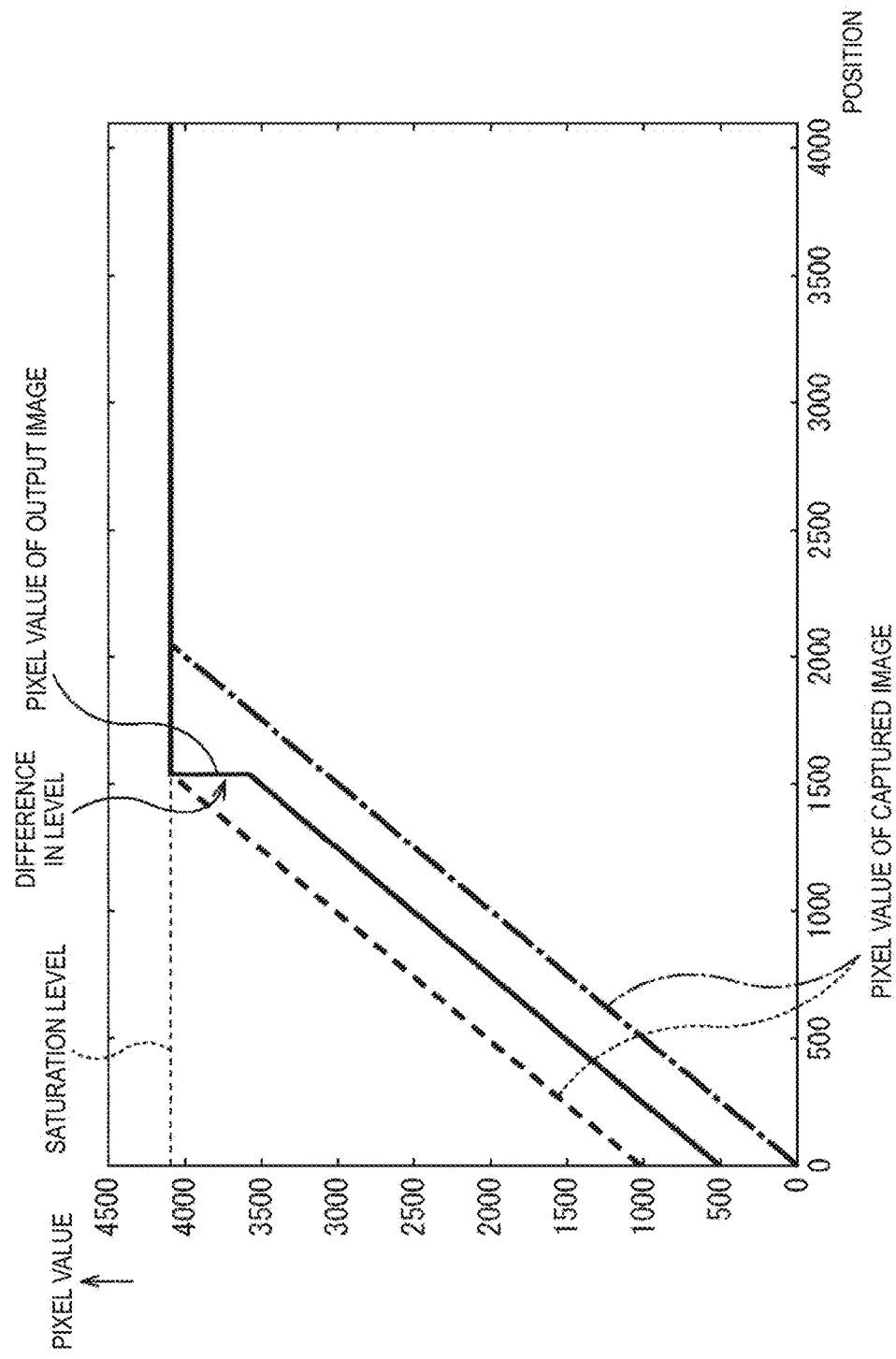
FIG. 19 is a diagram illustrating an example of pixel values of two captured images whose pixel values gradually change and an output image generated using the two captured images.

FIG. 19 is a diagram illustrating an example of a change in pixel value between two captured images whose pixel values gradually change and an output image generated using the two captured images.

Moreover, in FIG. 19, the horizontal axis represents the position of a pixel (e.g., the position in the horizontal direction), and the vertical axis represents a pixel value of the captured image and the output image.

As illustrated in FIG. 19, the pixel values of two captured images gradually rise like the ramp signal from the left to the right, and reach the saturation level (saturated state) of the pixel value.

However, the pixel values of the two captured images are out of phase. In other words, the pixel value of one captured image of the two captured images is the pixel value obtained by shifting the pixel value of the other captured image in the horizontal direction.

In this case, in the third example of the generation process (FIG. 18), until one of the pixel values of the corresponding pixels of the two captured images reaches the saturation level, the average value ave of the pixel values of the corresponding pixels of the two captured images is obtained as the pixel value of the output image.

The pixel values of the two captured images gradually rise from the left to the right, and so the average value ave of the pixel values of the two captured images gradually rises from the left to the right.

The pixel values of the two captured images gradually rise from the left to the right in a state where the phase is shifted, and so the pixel value of one of the two captured images reaches the saturation level prior to the other one.

When the pixel value of one of the two captured images reaches the saturation level prior to the other one, the pixel value of the saturation level is obtained as the pixel value of the output image.

Thus, for the pixel in the horizontal direction of the output image, the average value ave of the pixel values of the two captured images from the left to the right is obtained as the pixel value of the output image. However, when the pixel value of one of the two captured images reaches the saturation level, the saturation level is obtained as the pixel value of the output image from the position of the pixel of the pixel value that has reached the saturation level.

As a result, at the position of the pixel at the saturation level, the pixel value of the output image suddenly rises to the saturation level, which causes a difference in level. Then, the image quality of the output image is deteriorated due to this difference in level.

An example of a method of preventing the deterioration of the image quality of the output image due to occurrence of the difference in level of the pixel value as described above includes, in one example, a method of blending the maximum value max with the average value ave in accordance with a predetermined blend ratio a1 (0=<a1<=1) and of obtaining a blend value obtained by the blending as the pixel value of the output image in the generation processing.

Figure 20:
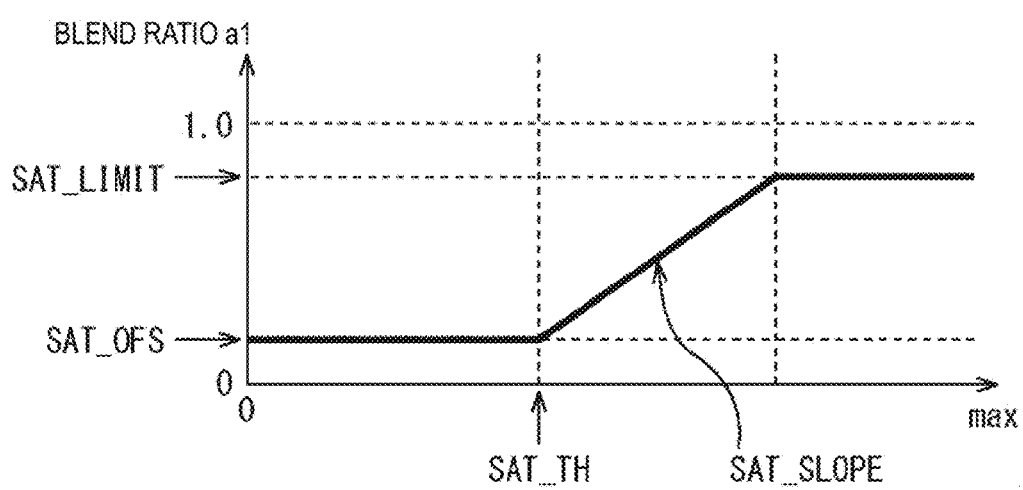
FIG. 20 is a diagram illustrating an example of a blend ratio a1 used to blend a maximum value max and an average value ave.

FIG. 20 is a diagram illustrating an example of the blend ratio a1 used to blend the maximum value max and the average value ave.

As the blend ratio a1, in one example, it is possible to employ a value corresponding to the maximum value max of the pixel values of the corresponding pixels of the N captured images.

In FIG. 20, in a case where the maximum value max is equal to or less than a threshold value SAT_TH of the maximum value max, a value SAT_OFS (>=0) is employed as the blend ratio a1.

In addition, in FIG. 20, in a case where the maximum value max is larger than the threshold SAT_TH, a value SAT_SLOPE (>SAT_OFS) that is proportional to the maximum value max is employed as the blend ratio a1.

Then, in a case where the value SAT_SLOPE proportional to the maximum value max is larger than or equal to a threshold value SAT_LIMIT of the blend ratio a1 (where SAT_OFS<SAT_LIMIT=<1), the threshold value SAT_LIMIT is employed as the blend ratio a1.

Figure 21:
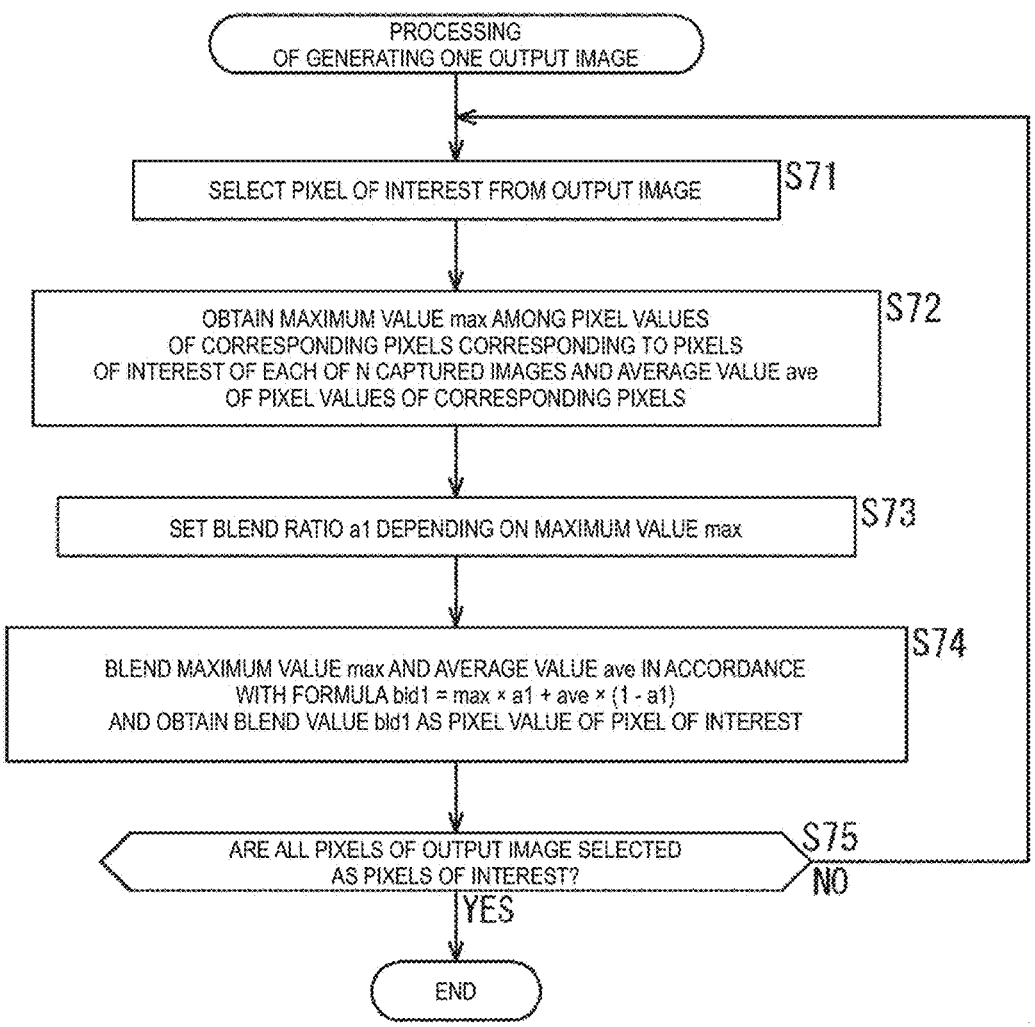
FIG. 21 is a flowchart illustrated to describe a fourth example of generation processing of generating one output image from N captured images.

FIG. 21 is a flowchart illustrated to describe a fourth example of generation processing of generating one piece (frame) of output image from N captured images.

Specifically, FIG. 21 is a flowchart illustrated to describe an example of the generation process of obtaining, as the pixel value of the output image, a blend value obtained by blending the maximum value max with the average value ave in accordance with the blend ratio a1.

In the fourth example of the generation processing, the signal processing unit 4 performs the similar processing to the steps S61 and S62 of FIG. 18 in steps S71 and S72, respectively. Thus, the pixel of interest of the output image is selected and the maximum value max and the average value ave of the pixel values of the corresponding pixels corresponding to the pixels of interest are obtained, then the processing proceeds from step S72 to step S73.

In step S73, as described in FIG. 20, the signal processing unit 4 obtains a value corresponding to the maximum value max as the blend ratio a1, and then the processing proceeds to step S74.

In step S74, the signal processing unit 4 blends the maximum value max and the average value ave in accordance with a formula bld1=max×a1+ave×(1−a1), in one example, and obtains a resultant blend value bld1 as the pixel value of the pixel of interest. Then, the processing proceeds to step S75.

In step S75, the signal processing unit 4 determines whether all the pixels of the output image are selected as the pixels of interest.

If it is determined in step S75 that not yet all the pixels of the output image are selected as the pixels of interest, then the processing returns to step S71 and the similar processing is repeated thereafter.

In addition, if it is determined in step S75 that all the pixels of the output image are selected as the pixels of interest, then the generation process of generating one output image is terminated.

As described above, a value corresponding to the maximum value max is obtained as the blend ratio a1, and the blend value bld1 obtained by blending the maximum value max and the average value ave in accordance with the blend ratio a1 is obtained as the pixel value of the pixel of interest. Thus, in the case where the maximum value max is small, a value obtained by weighting the average value ave is obtained as the pixel value of the pixel of interest. In addition, as the maximum value max increases, a value obtained by weighting the maximum value max is obtained as the pixel value of the pixel of interest.

Consequently, it is possible to eliminate the occurrence of false color in the output image as described with reference to FIG. 17, and to prevent the deterioration in image quality of the output image due to a difference in level of the pixel values as described in FIG. 19.

Moreover, in the case where the maximum value max is the saturation level, the blend ratio a1 is set to 1, and in the case where the maximum value max is less than the saturation level, the blend ratio a1 is set to 0. This makes the generation processing of FIG. 21 equivalent to the generation processing of FIG. 18.

Figure 22:
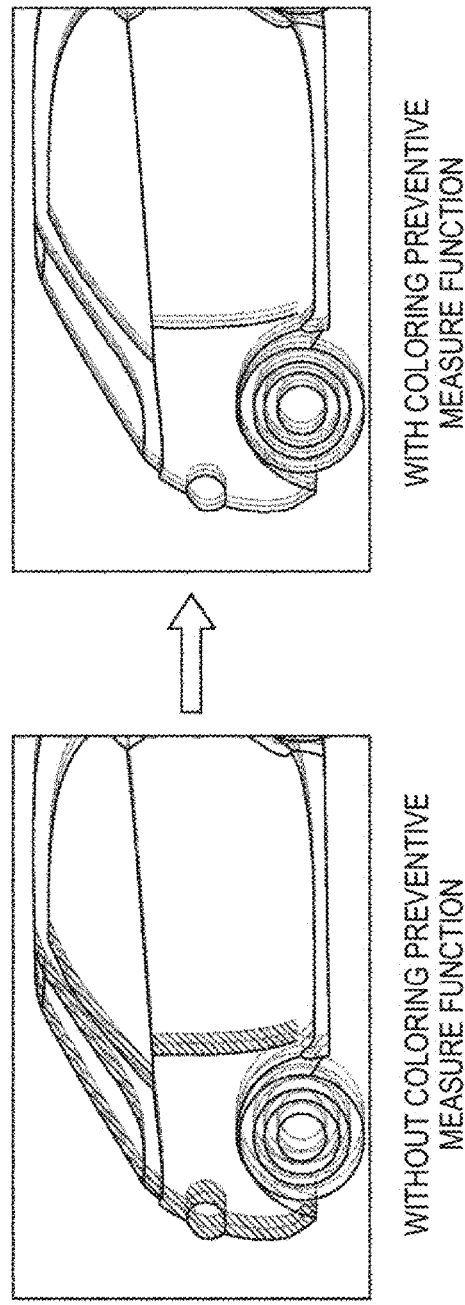
FIG. 22 is a diagram illustrating an example of an output image generated by generation processing.

FIG. 22 is a diagram illustrating an example of the output image (the output image with the average value ave) generated by the generation processing of FIG. 9 and the output image generated by the generation processing of FIG. 18 or 21.

The output image (the output image with the average value ave) generated by the generation processing of FIG. 9 is also referred to as an output image without a coloring preventive measure function, and the output image generated by the generation processing of FIG. 18 or 21 is also referred to as an output image with the coloring preventive measure function.

In the output image without the coloring preventive measure function, false color may occur as indicated by hatching in the figure, but in the output image with the coloring preventive measure function, it is possible to prevent the occurrence of false color.

Here, the captured image is an image having RAW data of only one color among R, G, and B as the pixel value, and three pixels Pr, Pg, and Pb that are close to each other have R, G, and B as pixel values, respectively in such captured image.

Assume that, in one example, of two captured images, the pixel value (R, G, B) of three pixels Pr, Pg, and Pb of the first captured image is (2000, 4000, 2000) and the pixel values (R, G, B) of three pixels Pr, Pg, and Pb of the second captured image are (0, 0, 0). In addition, in one example, the WB gain (Gr, Gg, Gb) is assumed to be (2, 1, 2).

Moreover, the saturation level is assumed to be 4000. The pixel value G of the pixel Pg of the first captured image is 4000 and is saturated.

The results (R', G', B') obtained by applying the WB gain (Gr, Gg, Gb)=(2, 1, 2) to the pixel value (R, G, B)=(2000, 4000, 2000) of the three pixels Pr, Pg, and Pb of the first captured image are (4000, 4000, 4000), and are white (saturated state).

The results (R', G', B') obtained by applying the WB gain (Gr, Gg, Gb)=(2, 1, 2) to the pixel value (R, G, B)=(0, 0, 0) of the three pixels Pr, Pg, and Pb of the second captured image are (0, 0, 0), and are black.

Thus, it is desirable that the three pixels Pr, Pg, and Pb of the output image are white or black.

However, in the case of selecting the average value ave or the maximum value max of the corresponding pixels of the captured image, which is the pixel value of the output image, depending on only the corresponding pixels of the captured image (FIG. 18) or in the case of obtaining the blend ratio a1 (FIG. 21), green coloring with high sensitivity (low WB gain) may occur in the output image.

In other words, in order to simplify the description, it is assumed that the average value ave or the maximum value max of the corresponding pixels of the captured image, that is the pixel value of the output image, is selected depending on only the corresponding pixels of the captured image.

For the pixel Pr, neither the pixel value R=2000 of the first captured image nor the pixel value R=0 of the second captured image are saturated, and so the average value ave=1000 of the output value is R=2000 and the pixel value R=0 is selected as the pixel value.

Similarly, for the pixel Pb, neither the pixel value B=2000 of the first captured image nor the pixel value B=0 of the second captured image are saturated, and so the average value ave=1000 of the value B=2000 and the pixel value B=0 is selected as the pixel value of the output image.

On the other hand, for the pixel Pg, of the pixel value G=4000 of the first captured image and the pixel value G=0 of the second captured image, the pixel value G=4000 of the first captured image is saturated, and so the saturated pixel value G=4000 is selected as the pixel value of the output image.

Thus, the pixel values (R, G, B) of the three pixels Pr, Pg, and Pb of the output image are (1000, 4000, 1000).

The results (R', G', B') obtained by applying the WB gain (Gr, Gg, Gb)=(2, 1, 2) to the pixel values (R, G, B)=(1000, 4000, 1000) of the output image are (2000, 4000, 2000) by clipping a value larger than or equal to the saturation level to 4000 that is the saturation level, and thus it becomes green.

It is possible to prevent the above-described green coloring, which is not in the captured image, occurring in the output image, by performing the generation processing using a pixel value of the pixel P after application of LPF, which can be obtained by, in one example, applying a low pass filter (LPF) to the captured image in a case where a pixel P in the captured image is a corresponding pixel.

In other words, in addition to a pixel value of the pixel P before application of LPF, a pixel value of pixels around the pixel P is incorporated into the pixel value of the pixel P after application of LPF.

Depending on the pixel value of the pixel P after application of LPF, it is possible to select the average value ave or the maximum value max of the corresponding pixels of the captured image, which is the pixel value of the output image in FIG. 18, or to prevent green coloring, which occurs in the output image and is not in the captured image, by obtaining the blend ratio a1.

Moreover, it is desirable that the pixel value used when LPF is applied to the pixel P includes the pixel values of the three colors R, G, and B of the pixels around the pixel P including the pixel P. However, it is possible to sufficiently prevent green coloring, which occurs in the output image and is not in the captured image, by merely using the pixel values of the pixel P and several pixels adjacent in the horizontal direction of the pixel P.

Figure 23:
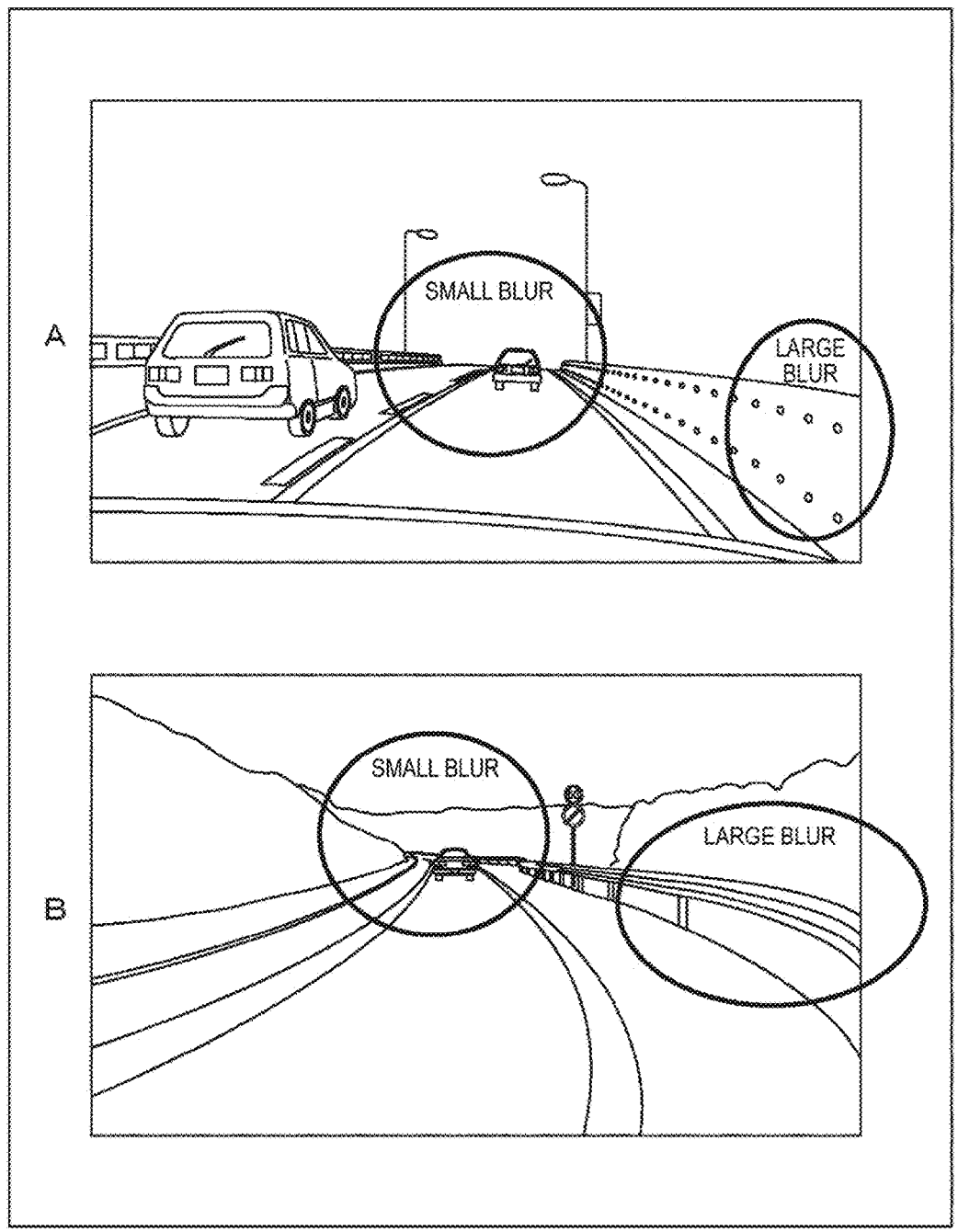
FIG. 23 is a diagram illustrated to describe motion blur that occurs in an output image.

FIG. 23 is a diagram illustrated to describe motion blur that occurs in the output image.

The portion A of FIG. 23 illustrates an example of a captured image captured in the new high-speed mode.

In the case where a subject projected on the captured image is moving, that is, in one example, in the case where the camera unit serving as an onboard camera is mounted on a moving object such as an automobile, a moving subject projected on the captured image has motion blur.

In one example, in a case where the automobile is going straight ahead, a subject projected on the peripheral portion (end portion) in the horizontal direction moves faster than that of a subject projected on the central portion in the horizontal direction of the captured image. Thus, larger motion blur occurs in the peripheral portion rather than the central portion in the horizontal direction of the captured image as illustrated in the portion A of FIG. 23.

The portion B of FIG. 23 illustrates an example of a captured image captured in the new high-speed mode.

In one example, in a case where the automobile turns a curve, a subject in the direction opposite to the direction of the curve moves faster than a subject in the direction of the curve in the horizontal direction of the captured image. Thus, as illustrated in the portion B of FIG. 23, larger motion blur occurs at the portion in the direction opposite to the direction of the curve rather than the portion in the direction of the curve in the horizontal direction of the captured image.

In addition, in the captured image, motion blur increases, in one example, as the speed of the automobile increases.

In a case where motion blur occurs in N captured images, if the average value ave of pixel values of the N captured images in which such motion blur occurs is obtained as the pixel value of the output image, a larger degree of motion blur occurs.

In addition, in a case where motion blur occurs in N captured images, a subject projected on one captured image is projected at a shifted position in another captured image, and so if such average value ave of the pixel values of the N image captures is obtained as the pixel value of the output image, a larger degree of motion blur still occurs in the output image.

On the other hand, in a case where motion blur occurs in N captured images, among the output images obtained by using the N captured images, an output image in which the pixel value of one captured image of the N captured images is obtained as e pixel value of the output image without modification becomes an image having the smallest degree of motion blur.

Then, in order to prevent the motion blur occurring in the output image, in the generation processing of the output image, it is possible to obtain a blend ratio a2 ($0=<a2<=1$), depending on the motion amount of a subject projected on the output image (i.e., captured image), position of the pixel of interest, speed of the automobile including a camera unit mounted thereon, direction or degree of curvature in the curve when the automobile is running on the curve, or the like. In addition, it is possible to obtain the output image by blending the average value ave or the maximum value max and the pixel value of any one captured image in accordance with the blend ration a2.

Moreover, as the direction or the degree of curvature (physical quantity representing the curve) when the automobile turns a curve, in one example, it is possible to employ a steering angle of the steering wheel of the automobile.

Figure 24:
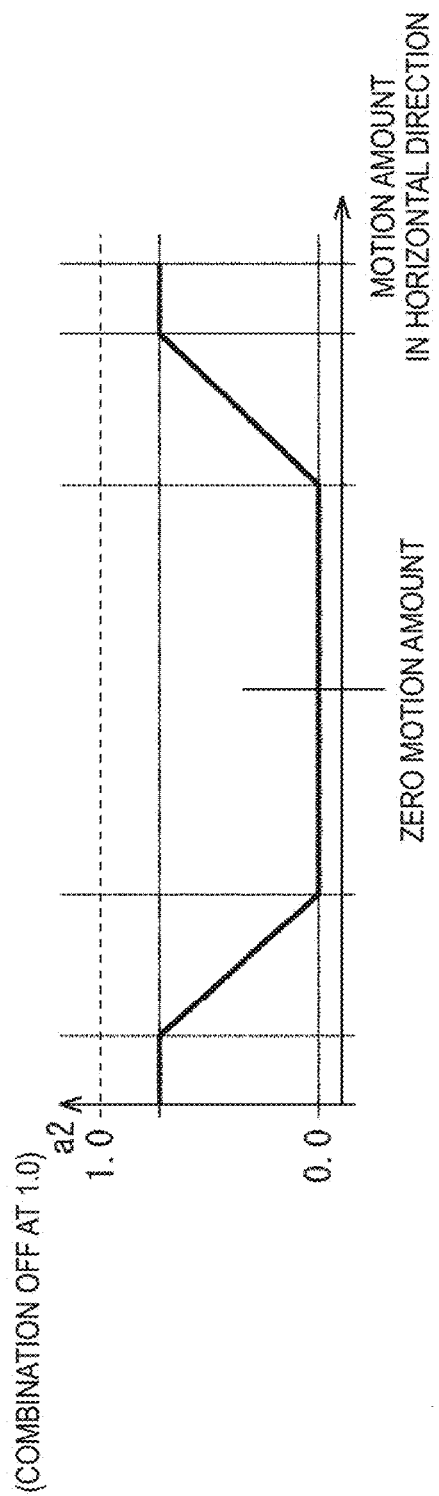
FIG. 24 is a diagram illustrating an example of a blend ratio a2 in a case of obtaining a value corresponding to the motion amount of a subject projected on an output image (or captured image) as the blend ratio a2.

FIG. 24 is a diagram illustrating an example of the blend ratio a2 when a value corresponding to the motion amount of a subject projected on the output image (or captured image) is obtained as the blend ratio a2.

In the case where the value corresponding to the motion amount of the subject projected on the output image is obtained as the blend ratio a2, the signal processing unit 4 obtains, as the motion amount of the pixel of interest, in one example, motion of the corresponding pixel of one captured image of N captured images by block matching, feature point matching, or the like.

Furthermore, the signal processing unit 4 obtains the blend ratio a2 having a larger value as the magnitude (absolute value) of the motion amount is larger depending on the motion amount of the pixel of interest, as illustrated in FIG. 24.

In addition, the signal processing unit 4 selects one captured image as a generation image that is used for generation of an output image from among N captured images, in one example, in response to a user operation or the like.

Then, the signal processing unit 4 blends the average value ave (or the maximum value max) of the pixel values of the corresponding pixels of the N captured images with a pixel value side of the corresponding pixel of the generation image in accordance with a formula bld=side×a2+ave×(1−a2). Then, the signal processing unit 4 obtains the resultant blend value bld is obtained as the pixel value of the pixel of interest of the output image.

Figure 25:
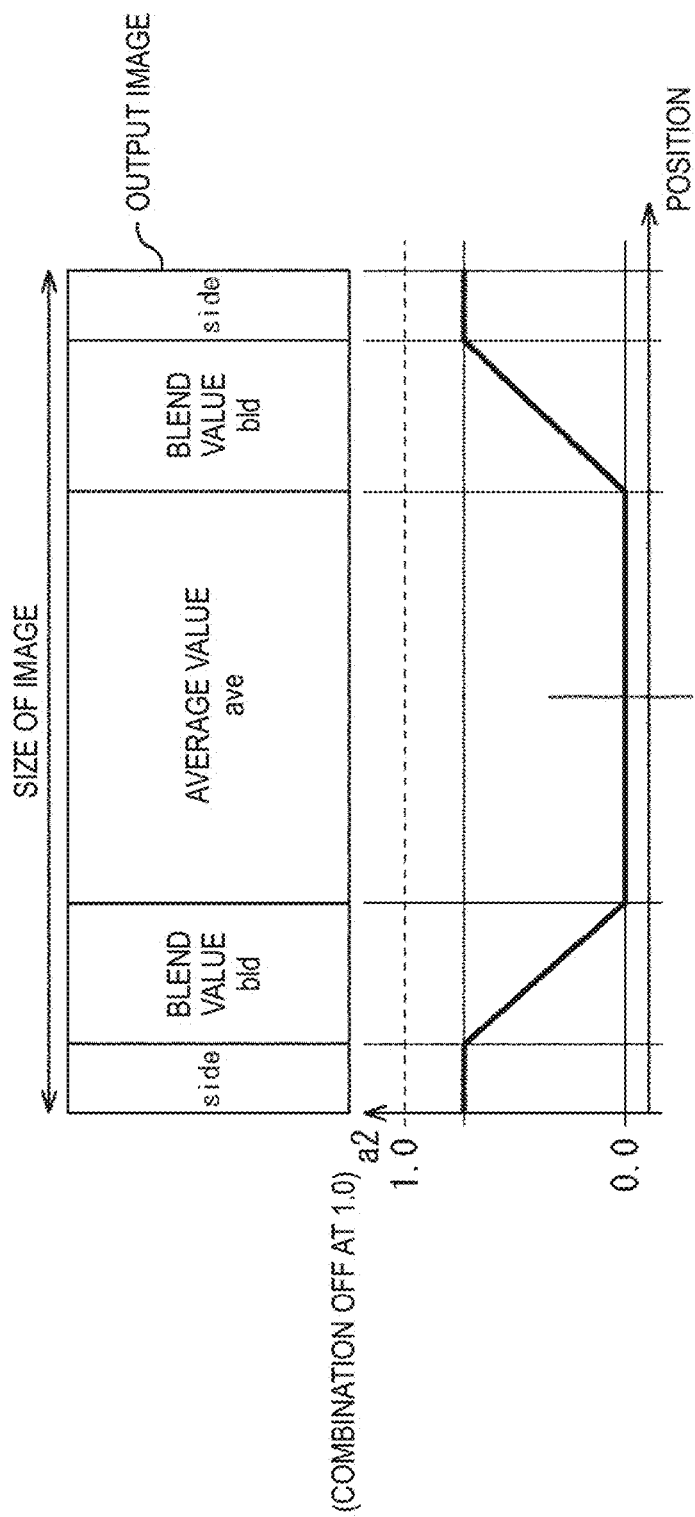
FIG. 25 is a diagram illustrating an example of a blend ratio a2 used in a case of blending the average value ave with a pixel value of the corresponding pixel of a generation image depending on the position of a pixel of interest of the output image.

FIG. 25 is a diagram illustrating, in a case where the average value ave (or the maximum value max) is blended with the pixel value of the corresponding pixel of the generation image depending on the position of the pixel of interest of the output image (the position of the corresponding pixel of the captured image), an example of the blend ration a2 used for the blending.

In the case where the blending is performed depending on the position of the pixel of interest of the output image, the signal processing unit 4 obtains the blend ratio a2 having a larger value as the position of the pixel of interest in the horizontal direction becomes farther from the central portion in the horizontal direction of the output image depending on the position of the pixel of interest.

Further, the signal processing unit 4 selects one captured image as a generation image that is used for generation of an output image from among the N captured images in response to a user operation or the like.

Then, the signal processing unit 4 blends the average value ave (or the maximum value max) of the pixel values of the corresponding pixels of the N captured images with the pixel value side of the corresponding pixel of the generation image in accordance with the formula bld=side× a2+ave×(1−a2). Then, the signal processing unit 4 obtains the resultant blend value bld as the pixel value of the pixel of interest of the output image.

It is possible to obtain the blend ratio a2 depending on the speed of the automobile having the camera unit mounted thereon or the steering angle of a steering wheel, in addition to the motion amount or position of the pixel of interest, as described above.

In other words, depending on only one item among the motion amount of the pixel of interest, the position of the pixel of interest, the speed of the automobile having the camera unit mounted thereon, and the steering angle of the steering wheel, it is possible to obtain the blend ratio a2 as a function of the one item.

Further, depending on two or more items among the motion amount of the pixel of interest, the position of the pixel of interest, the speed of the automobile having the camera unit mounted thereon, and the steering angle of the steering wheel, it is possible to obtain the blend ratio a2 as a function of the two or more items.

Figure 26:
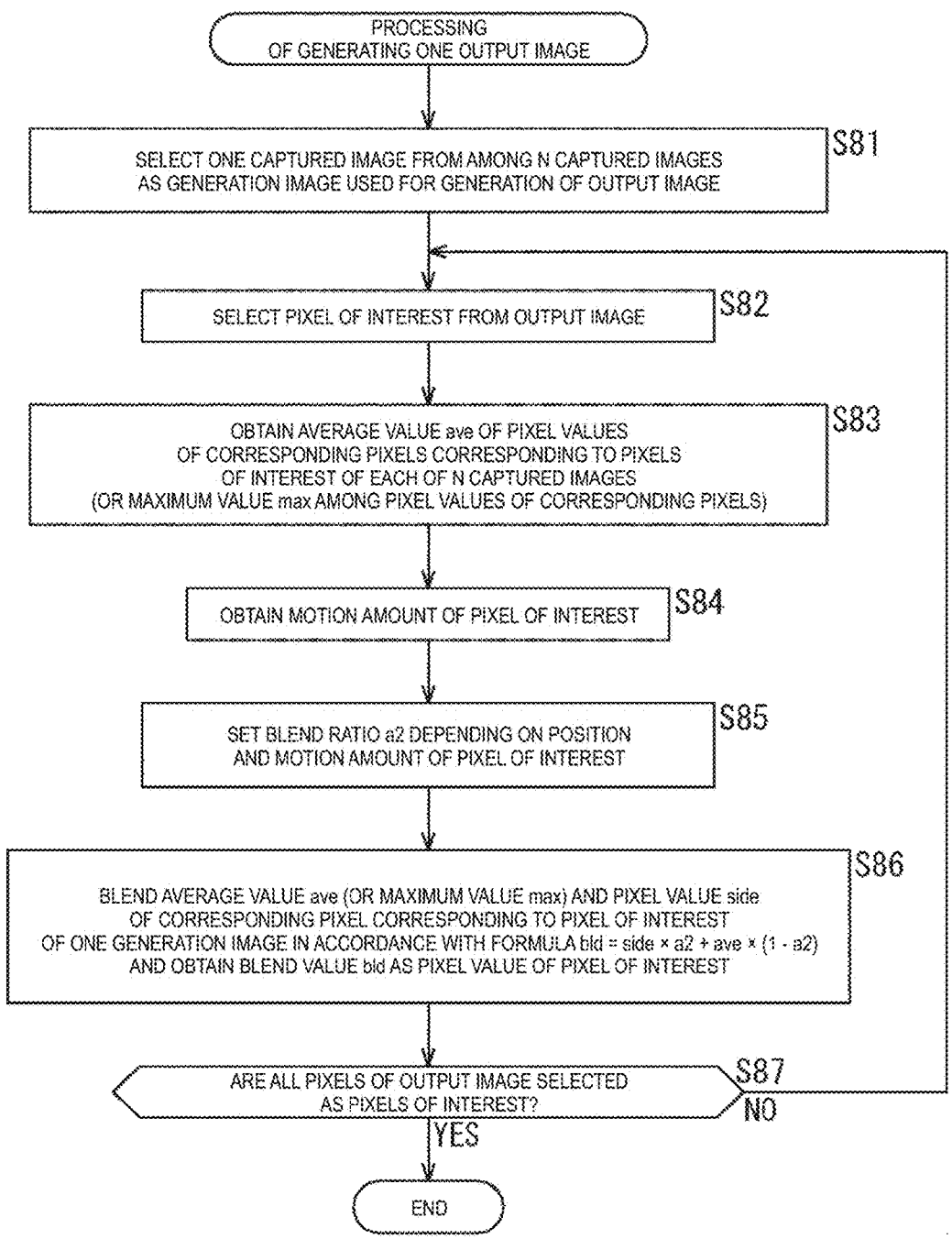
FIG. 26 is a flowchart illustrated to describe a fifth example of generation processing of generating one output image from N captured images.

FIG. 26 is a flowchart illustrated to describe a fifth example of generation processing of generating one piece (frame) of output image from N captured images.

Specifically, FIG. 26 is a flowchart illustrated to describe an example of generation processing of obtaining, as the pixel value of the output image, a blend value obtained by blending the average value ave (or the maximum value max) with the pixel value of the generation image.

In the fifth example of the generation processing, in step S81, the signal processing unit 4 selects one captured image of the N captured images as the generation image, and the processing proceeds to step S82.

Here, in step S81, in one example, it is possible to select one captured image of the N captured images as the generation image in response to the user operation. Further, in step S81, in one example, it is possible to select captured images of the number that is set in advance in the camera unit of the N captured images as the generation image.

In step S82, the signal processing unit 4 selects the pixel of interest of the output image, which is similar to step S41 of FIG. 8, and then the processing proceeds to step S83.

In step S83, the signal processing unit 4 obtains the average value ave (or the maximum value max) of the pixel values of the corresponding pixels corresponding to the pixels of interest, which is similar to step S52 of FIG. 9 (or step S42 of FIG. 8), and then processing proceeds to step 84.

In step S84, the signal processing unit 4 obtains the motion amount of the pixel of interest, and then the processing proceeds to step S85.

In step S85, the signal processing unit 4 obtains (sets) the blend ratio a2 depending on the motion amount and position of the pixel of interest, and then the processing proceeds to step S86.

Here, in step S85, it is possible for the signal processing unit 4 to obtain a blend ratio a2' depending on the motion amount of the pixel of interest as described with reference to FIG. 24, to obtain a blend ratio a2" depending on the position of the pixel of interest as described with reference to FIG. 25, and to obtain the average value, multiplication value, or the like between the blend ratio a2' depending on the motion amount and blend ratio a2" depending on the position as the blend ratio a2 depending to the motion amount and the position of the pixel of interest.

In step S86, in one example, the signal processing unit 4 blends the average value ave (or the maximum value max) with the pixel value side of the corresponding pixel of the generation image in accordance with the formula bld=side×a2+ave×(1−a2), and the resultant blend value bld is obtained as the pixel value of the pixel of interest. Then, the processing proceeds to step S87.

In step S87, the signal processing unit 4 determines whether all the pixels of the output image are selected as the pixel of interest.

If it is determined in step S87 that not yet all the pixels of the output image are selected as the pixel of interest, the processing returns to step S82 and the similar processing is repeated thereafter.

Further, if it is determined in step S87 that all the pixels of the output image are selected as the pixel of interest, then the generation process of generating one output image is terminated.

FIG. 27 is a diagram illustrating an example of the output image (the output image with the average value ave) generated by the generation processing of FIG. 9 and the output image generated by the generation processing of FIG. 26.

The output image (the output image with the average value ave) generated by the generation processing of FIG. 9 is also referred to as an output image without the motion-blur preventive measure function, and the output image generated by the generation processing of FIG. 26 is referred to as an output image with the motion-blur preventive measure function.

FIG. 27 illustrates an example of an image at the peripheral portion (edge portion) in the horizontal direction of each of the output image without the motion-blur preventive measure function and the output image with the motion-blur preventive measure function. A large motion blur occurs in the periphery of the output image without the motion-blur preventive measure function, but it can be found that the degree of the motion blur is prevented in the periphery of the output image with the motion-blur preventive measure function.

Here, in the following description, the blend ratio a1 described in FIG. 20 or the like is also referred to as a coloring preventive measure blend ratio a1, and the blend ratio a2 described in FIGS. 24 and 25 or the like is also referred to as a motion-blur preventive measure blend ratio a2.

Figure 28:
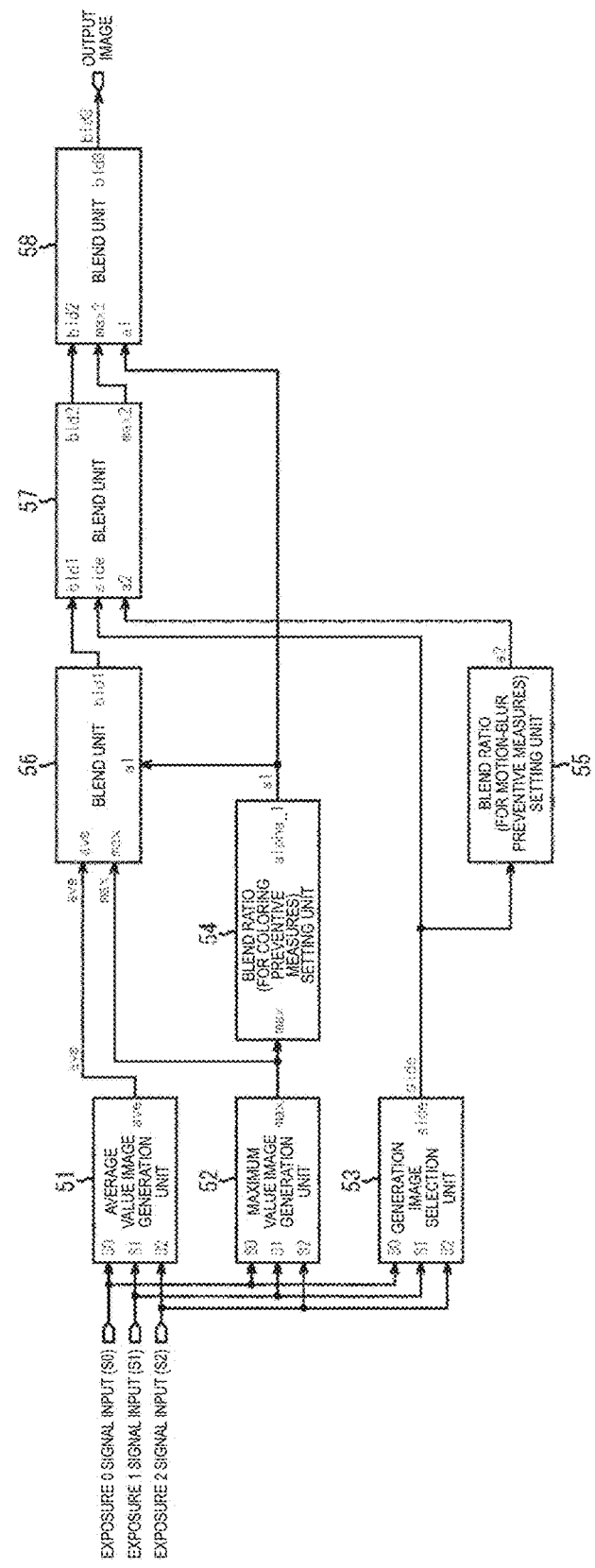
FIG. 28 is a block diagram illustrating a configuration example of a generation device configured to perform a sixth example of generation processing of generating one output image from N captured images.

FIG. 28 is a block diagram illustrating a configuration example of a generation device that performs a sixth example of generation processing of generating one piece (frame) of output image from N captured images.

Specifically, FIG. 28 is a block diagram illustrating a configuration example of a generation device that performs a sixth example of generation processing of obtaining, as the pixel value of the output image, a blend value obtained by blending the average value ave, the maximum value max, and the pixel value of the generation image, in accordance with the coloring preventive measure blend ratio a1 and the motion-blur preventive measure blend ratio a2.

The generation device of FIG. 28 is incorporated in the signal processing unit 4.

In FIG. 28, the generation device is configured to include an average value image generation unit 51, a maximum value image generation unit 52, a generation image selection unit 53, a blend ratio (for coloring preventive measures) setting unit 54, a blend ratio (for motion-blur preventive measures) setting unit 55, and blend units 56, 57, and 58.

The average value image generation unit 51, the maximum value image generation unit 52, and the generation image selection unit 53 are supplied with, in one example, three captured images (pixel values thereof) S0, S1, and S2 as the N captured images.

The average value image generation unit 51 obtains an average value image in which the average value ave=(S0+S1+S2)/3 of the pixel values S0, S1, and S2 of the pixels at the same position in the three captured images supplied thereto is set as the pixel value, and supplies it to the blend unit 56.

The maximum value image generation unit 52 obtains a maximum value image in which the maximum value max=max (S0, S1, S2) of the pixel values S0, S1, and S2 of the pixels at the same position in the three captured images supplied thereto is set as the pixel value, and supplies it to the blend ratio setting unit 54 and the blend unit 56. Here, max (S0, S1, S2) represents the maximum value among S0, S1 and S2.

The generation image selection unit 53 selects one captured image of three captured images supplied thereto as a generation image and supplies it to the blend ratio setting unit 55 and the blend unit 57.

The blend ratio setting unit 54 obtains the coloring preventive measure blend ratio a1 of each pixel of the output image depending on the maximum value max that is the pixel value with the maximum value image supplied from the maximum value image generation unit 52, in one example, as described with reference to FIG. 20, and supplies it to the blend units 56 and 58.

The blend ratio setting unit 55 obtains the motion amount of each pixel of the output image using the generation image from the generation image selection unit 53. Then, the blend ratio setting unit 55 obtains the motion-blur preventive measure blend ratio a2 of each pixel of the output image depending on the motion amount of each pixel of the output image and the position of each pixel, as described with reference to FIGS. 24 to 26, and supplies it to the blend unit 57.

Moreover, it is possible for the blend ratio setting unit 55 to obtain the motion-blur preventive measure blend ratio a2 than the above, in one example, depending on only one item among the motion amount and position of the pixel of the output image, the speed of the automobile on which the camera unit is mounted, and the steering angle of the steering wheel.

Further, it is possible for the blend ratio setting unit 55 to obtain the motion-blur preventive measure blend ratio a2, in one example, depending on two or more items among the motion amount and position of the pixel of the output image, the speed of the automobile on which the camera unit is mounted, and the steering angle of the steering wheel.

The blend unit 56 blends the average value ave, which is the pixel value of each pixel of the average value image supplied from the average value image generation unit 51, and the maximum value max, which is the pixel value of each pixel of the maximum value image supplied from the maximum value image generating unit 52, in accordance with a formula bld1=max×a1+ave×(1−a1) using the blend ratio a1 from the blend ratio setting unit 54. Then, the blend unit 56 supplies a first blend image (bld1) having a blend value bld1 obtained by the blending as the pixel value to the blend unit 57.

The blending performed by the blend unit 56 allows the occurrence of false colors described with reference to FIG. 17 to be prevented.

The blend unit 57 blends the pixel value side of each pixel of the generation image supplied from the generation image selection unit 53 and the pixel value bld1 of each pixel of the first blend image supplied from the blend unit 56 in accordance with a formula bld2=side×a2+bld1×(1−a2) using the blend ratio a2 from the blend ratio setting unit 55. Then, the blend unit 57 supplies a second blend image (bld2) having a blend value bld2 obtained by the blending as the pixel value to the blend unit 58.

Further, the blend unit 57 obtains a max2 image in which the maximum value max2=max (bld1, side) of the pixel value side of each pixel of the generation image supplied from the generation image selection unit 53 and the pixel value bld1 of the pixel at the same position in the first blend image supplied from the blend unit 56 as the pixel value, and supplies it to the blend unit 58. Here, max (bld1, side) represents the maximum value between bld1 and side.

The blending by the blend unit 57 allows the motion blur described with reference to FIG. 23 to be prevented.

The blend unit 58 blends the pixel value bld2 of each pixel of the second blend image supplied from the blend unit 57 and the pixel value max2 of the pixel at the same position of the max2 image supplied from the blend unit 57 in accordance with a formula bld3=max2×a1+bld2×(1−a1) using the blend ratio a1 from the blend ratio setting unit 54. Then, the blend unit 58 outputs, as an output image, an image whose pixel value is the blend value bld3 obtained by the blending.

The blending by the blend unit 58 makes it possible to prevent the occurrence of a color that does not originally exist in a pixel whose pixel value is the blend value bld2 obtained by blending the pixel value bld1 of the first blend image and the pixel value side of the generation image in the blend unit 57.

Moreover, in the blend unit 58, it is possible to make only the blend ratio a1 of the pixel in which the blend ratio a2 used for blending in the blend unit 57 in the preceding stage is not 0 or 1 effective.

In this case, the blend unit 58 performs blending of the pixel value bld2 of the second blend image and the pixel value max2 of the max2 image for only the pixel for which the blend ratio a1 is effective, and it is possible to set the pixel value bld2 of the second blend image as the pixel value of the output image without modification, in one example, with the blend ratio a1=0.

Figure 29:
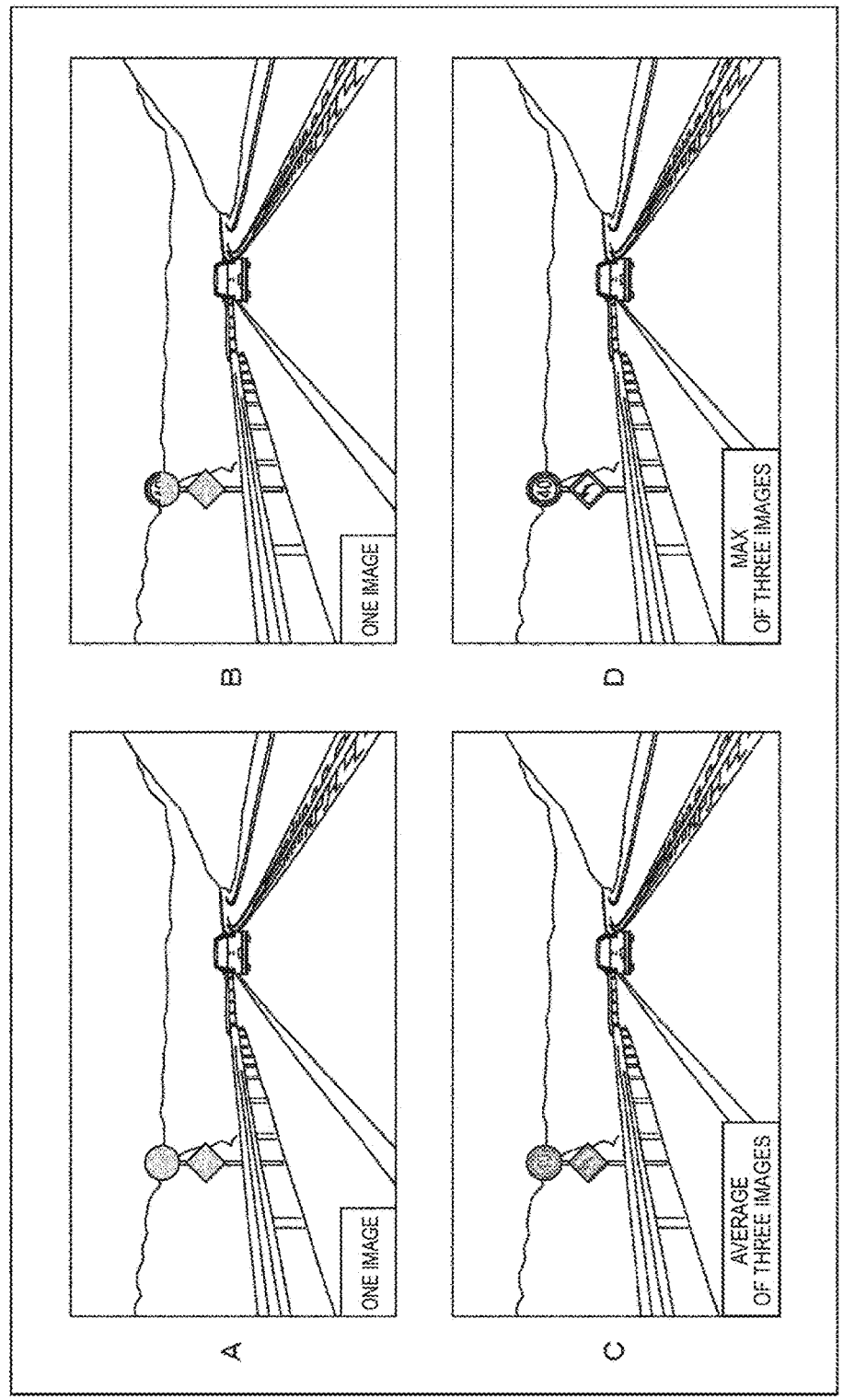
FIG. 29 is a diagram schematically illustrating an example of an output image captured by a commercially available onboard camera, an output image captured in the normal mode, and an output image captured in the new high-speed mode.
Figure 30:
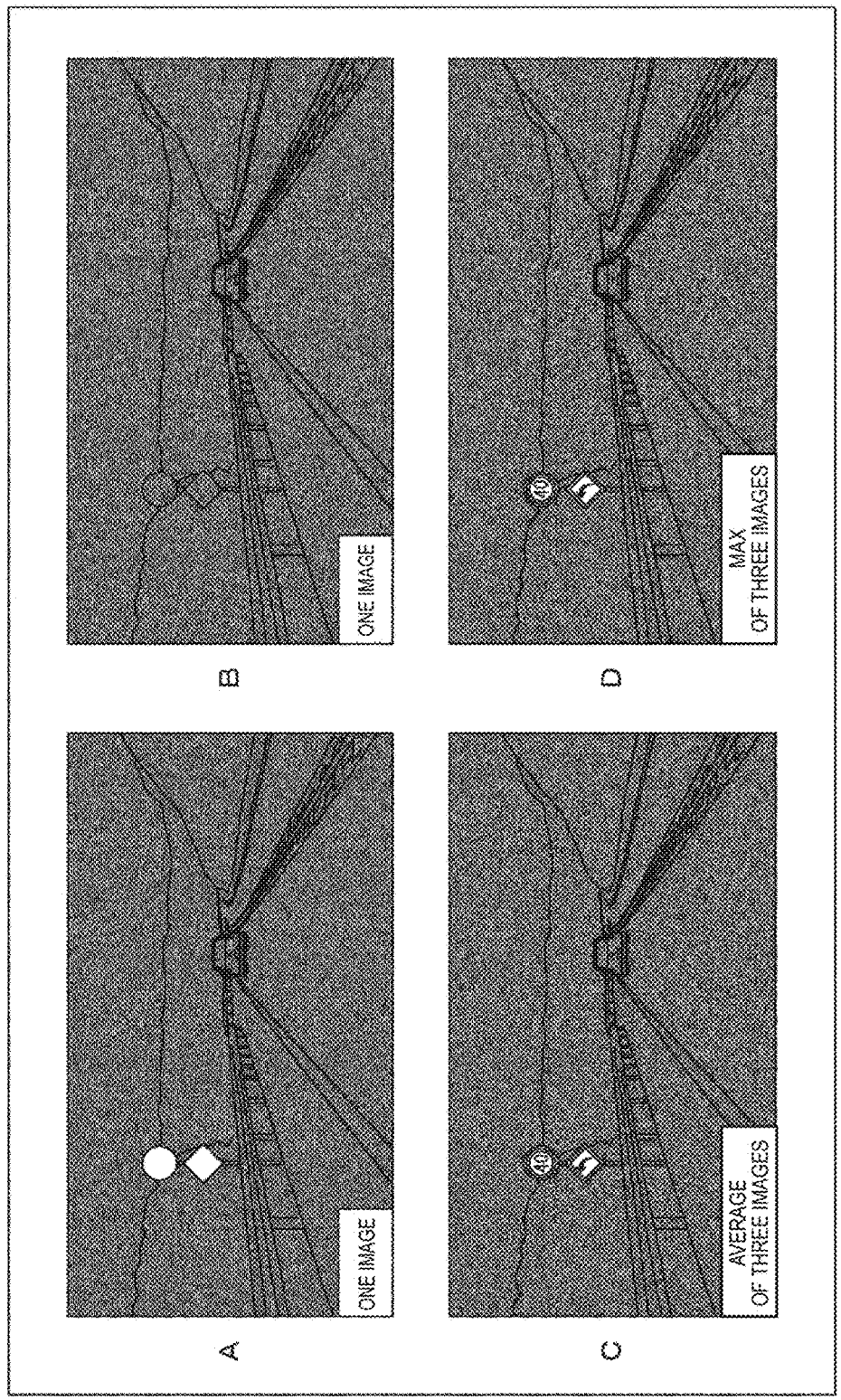
FIG. 30 is a diagram schematically illustrating an example of an output image captured by a commercially available onboard camera, an output image captured in the normal mode, and an output image captured in the new high-speed mode.

FIGS. 29 and 30 are diagrams schematically illustrating an example of an output image captured by a commercially available onboard camera, an output image captured in the normal mode, and an output image captured in the new high-speed mode.

Specifically, FIGS. 29 and 30 illustrate an output image obtained under different image capture conditions.

FIG. 29 illustrates an output image obtained by image capture with large illuminance, in one example, in the daytime, and FIG. 30 illustrates an output image obtained by image capture with low illuminance, in one example, in the nighttime.

In addition, FIG. 29 and the portion A of FIG. 30 illustrate, in the case where a captured image captured by a commercially available onboard camera is used as an output image without modification, the output image (hereinafter, also referred to as a commercially available camera output image).

FIG. 29 and the portion B of FIG. 30 illustrate, in the case where a captured image captured in the normal mode is used as an output image without modification, the output image (hereinafter, also referred to as normal mode output image).

FIG. 29 and the portion C of FIG. 30 illustrate, in the case where the average value ave of the pixel values of corresponding pixels of three captured images captured in the new high-speed mode is set as the pixel value of the output image, the output image (the output image of the average value ave).

FIG. 29 and the portion C of FIG. 30 illustrate, in the case where the maximum value max of the pixel values of the corresponding pixels of three captured images captured in the new high-speed mode is set as the pixel value of the output image, the output image (the output image of the maximum value max).

According to FIGS. 29 and 30, it can be found that the traffic sign is projected to be visible on the output image obtained in the new high-speed mode.

FIG. 31 illustrates an example of evaluating the visibility of the commercially available camera output image, the normal mode output image, the output image with the average value ave, and the output image with the maximum value max obtained by image capture in the daytime and nighttime.

The evaluation of visibility was carried out on the LED-based traffic signal (Signal) and traffic sign (Traffic Sign) serving as an image capture target projected on the commercially available camera output image, the normal mode output image, the output image with the average value ave, and the output with the maximum value max, which are obtained by image capture in the daytime (Day) and nighttime (night).

For traffic signals, the blinking frequency (frequency) is 100 Hz, and the turn-on duty ratio (duty) is 70%. In addition, for traffic signs, the blinking frequency is 250 Hz, and the turn-on duty ratio is 50% or 20%.

In FIG. 31, the satisfactory levels in visibility of symbols ×, ∆, ○, and ◉ increase in this order.

According to FIG. 31, it can be found that there may be a case where the output image with the maximum value max has more satisfactory visibility than the output image with the average value ave, or conversely, a case where the output image with the average value ave has more satisfactory visibility than the output image with the maximum value max depending on image capture conditions such as daytime or nighttime.

Thus, it is possible to obtain the output image by blending the average value ave and the maximum value max depending on the image capture conditions in the output image generation processing to improve the visibility of the output image.

Figure 32:
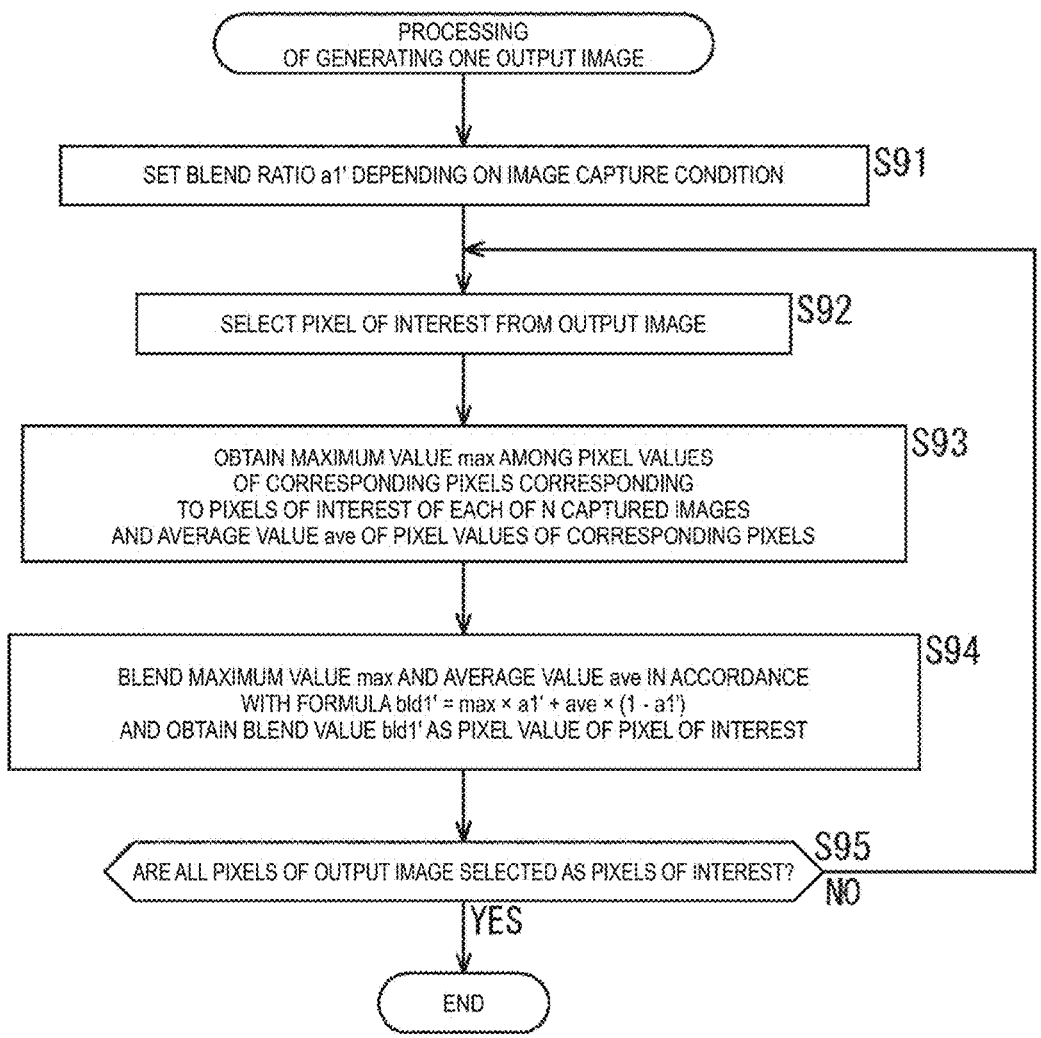
FIG. 32 is a flowchart illustrated to describe a seventh example of generation processing of generating one output image from N captured images.

FIG. 32 is a flowchart illustrated to describe a seventh example of generation processing of generating one piece (frame) of output image from N captured images.

Specifically, FIG. 32 is a flowchart illustrated to describe an example of the generation processing of obtaining the blend value obtained by blending the average value ave and the maximum value max as the pixel value of the output image in accordance with the blend ratio a1' depending on the image capture conditions.

In the seventh example of the generation processing, in step S91, the signal processing unit 4 obtains (sets) the blend ratio a1' depending on the image capture conditions, and the processing proceeds to step S92.

Here, in step S91, the signal processing unit 4 sets the blend ratio a1' of a large value ($0=<a1'=<1$) as the illuminance increase in capturing the captured image is large, in one example.

In step S92, the signal processing unit 4 selects one pixel of the output image as the pixel of interest, which is similar to step S41 of FIG. 8, and the processing proceeds to step S93.

In step S93, the signal processing unit 4 obtains the maximum value max and the average value ave of the pixel values of the corresponding pixels corresponding to the pixels of interest of each of the N captured images, and the processing proceeds to step S94.

In step S94, in one example, the signal processing unit 4 blends the maximum value max and the average value ave in accordance with a formula bld1'=max×a1'+ave×(1−a1'), and obtains a blend value bld1' obtained by the blending as the pixel value of the pixel of interest, then the processing proceeds to step S95.

In step S95, the signal processing unit 4 determines whether all the pixels of the output image are selected as the pixel of interest.

If it is determined in step S95 that not yet all the pixels of the output image are selected as the pixels of interest, the processing returns to step S92 and the similar processing is repeated thereafter.

If it is determined in step S95 that all the pixels of the output image are selected as the pixels of interest, the generation process of generating one output image is terminated.

As described above, it is possible to obtain an output image with satisfactory visibility by obtaining the blend ratio a1' depending on the image capture conditions and by blending the maximum value max and the average value ave in accordance with the blend ratio a1'.

Figure 33:
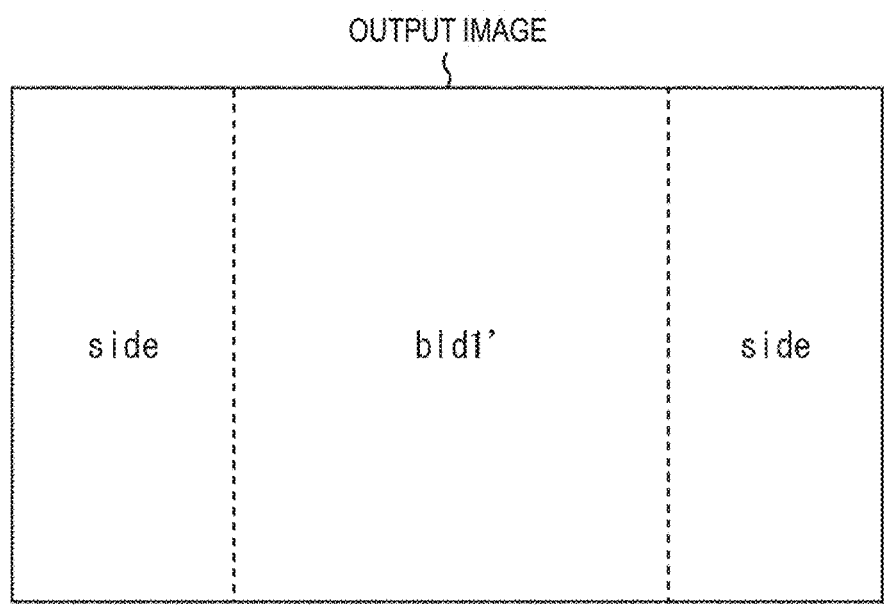
FIG. 33 is a diagram illustrated to describe an eighth example of generation processing of generating one output image from N captured images.

FIG. 33 is a diagram illustrated to describe an eighth example of generation processing of generating one piece (frame) of output image from N captured images.

As described with reference to FIG. 23, in one example, in the case where the camera unit serving as an onboard camera is mounted on a moving object such as an automobile, when the average value ave is set as the pixel value of the output image, large motion blur occurs in the periphery in the horizontal direction of the output image.

Furthermore, as described with reference to FIG. 23, in the case where motion blur occurs in N captured images, among the output images obtained using the N captured images, an output image in which the pixel value of a certain captured image among the N photographed images is used as the pixel value of the output image without modification becomes an image with the smallest degree of motion blur.

Thus, as described with reference to FIG. 32, in the case of blending the average value ave and the maximum value max according to the blend ratio a1' depending on image capture conditions, as illustrated in FIG. 33, it is possible to employ the blend value bld1' obtained by blending the average value ave and the maximum value max is employed as the pixel value of the central portion in the horizontal direction of the output image, and it is possible to employ the pixel value side of the generation image that is one captured image selected from among the N photographed images as the pixel value of the periphery in the horizontal direction of the output image.

In this case, it is possible to obtain an output image with satisfactory visibility and reduced motion blur.

Moreover, according to the generation processing by the signal processing unit 4, in the case of combining any N captured images including a captured image on which a blinking image capture target is projected, it is possible to prevent the occurrence of false color when the pixel values of one or more captured images among them are saturated.

Furthermore, according to the signal processing by the signal processing unit 4, in addition to the case where the camera unit is mounted on a moving body such as an automobile and the camera unit itself moves, in a case where the camera unit is fixed like a monitoring camera on a highway, it is possible to prevent the motion blur of the moving subject projected on the output image (captured image).

<Usage Examples of Camera Unit>

Figure 34:
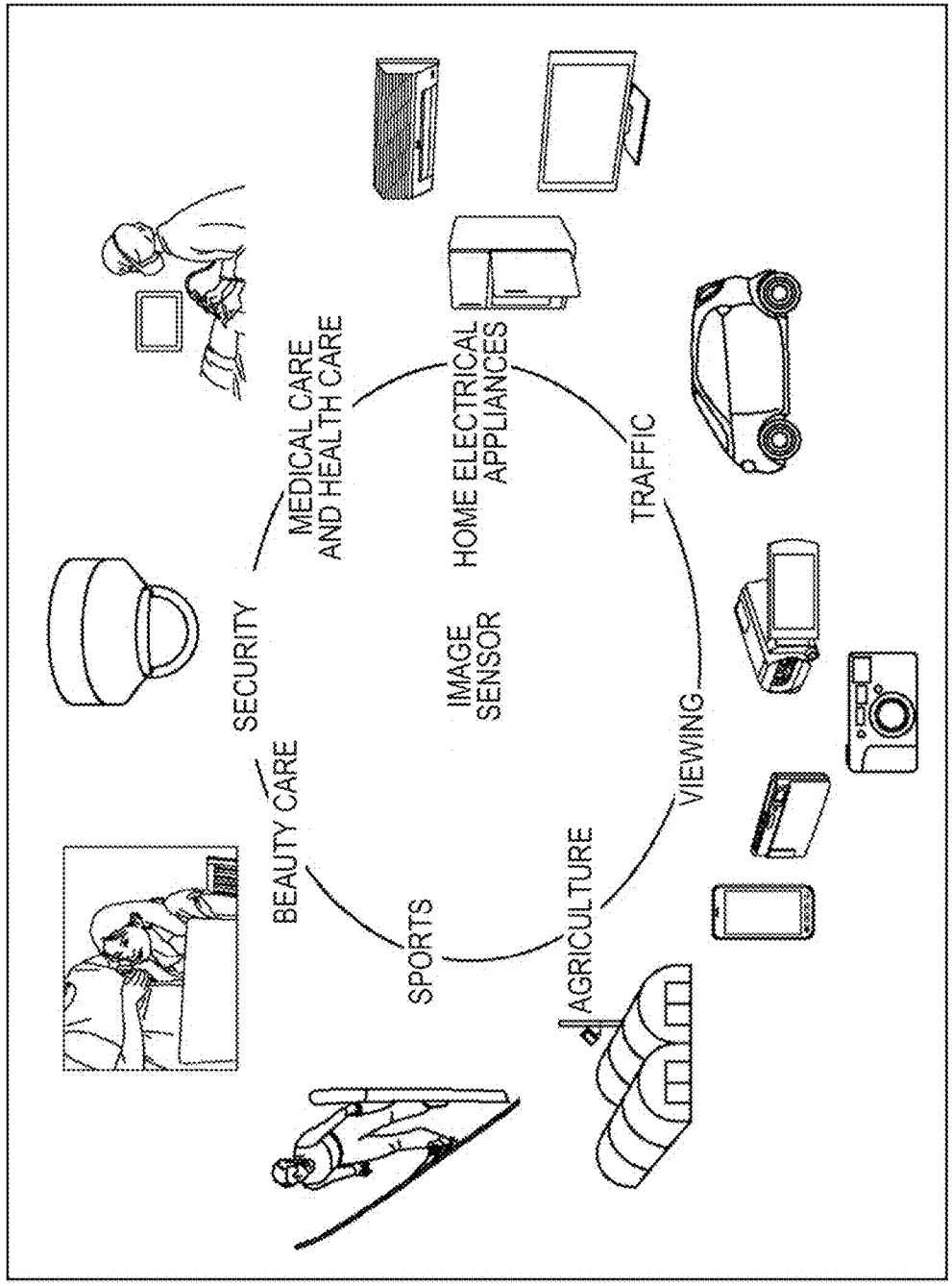
FIG. 34 is a diagram illustrating an example of use in which a camera unit is used.

FIG. 34 is a diagram illustrating usage examples in which the camera unit illustrated in FIG. 1 is used.

The above-described camera unit can be used for, in one example, various cases in which light such as visible light, infrared light, ultraviolet light, or X-rays is detected as follows.

Devices that capture an image provided for viewing, such as a digital camera and a portable appliance with a camera function Devices used for traffic, including an onboard sensor that captures an image of the front, back, surroundings, inside, or the like of a car, a monitoring camera that monitors travelling vehicles or roads, a distance sensor that measures a distance between vehicles or the like, which are used for the safe driving such as automatic stop, recognition of the condition of a driver, or the like Devices used for home electrical appliances including TVs, refrigerators, and air conditioners, which are used to capture an images of the user's gesture and perform the device operation in accordance with the gesture Devices used for medical care or health care, including an endoscope and a device that performs angiography by reception of infrared light Devices used for security, including a monitoring camera for crime prevention and a camera for personal authentication Devices used for beauty care, including skin measurement equipment that captures an image of the skin and a microscope that captures an image of the scalp Devices used for sports, including an action camera or wearable camera for sports and the like Devices used for agriculture, including a camera for monitoring the condition of the field and crops <Description of Computer to which Present Technology is Applied>

The series of processing of the signal processing unit 4 and the timing control unit 6 illustrated in FIG. 1 can be performed by hardware or software. In the case where the series of processing is performed by software, a program that constitutes the software is installed in a microcomputer, or the like.

Figure 35:
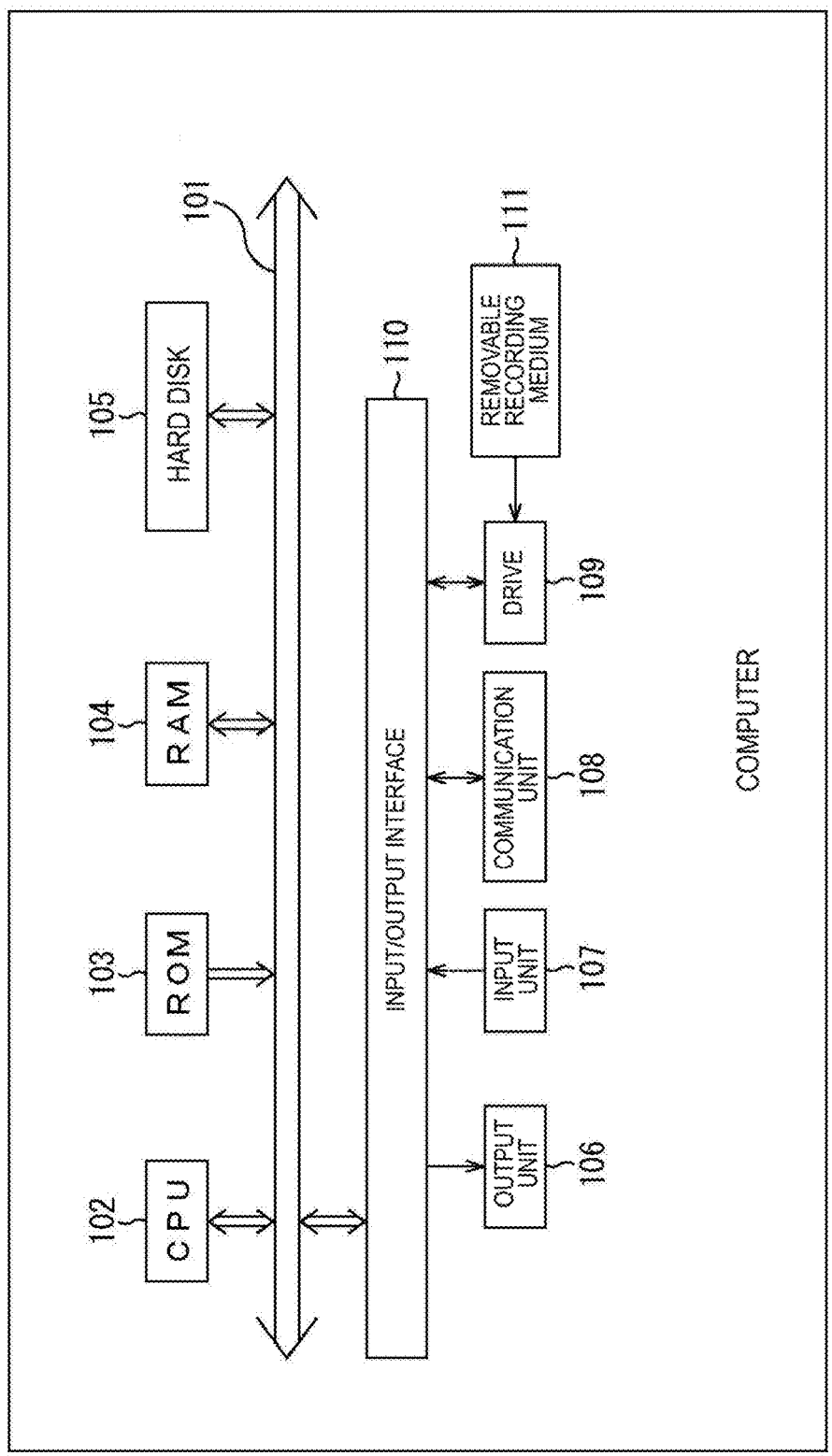
FIG. 35 is a block diagram illustrating a configuration example of an embodiment of a computer to which the present technology is applied.

FIG. 35 is a block diagram illustrating a configuration example of an embodiment of a computer in which a program for executing the above-mentioned series of processing is installed.

It is possible to record the program in advance on a hard disk 105 or a ROM 103 serving as a recording medium incorporated in the computer.

Alternatively, the program can be stored (recorded) on a removable recording medium 111. It is possible to provide such removable recording medium 111 as so-called packaged software. In this regard, an example of the removable recording medium 111 includes a flexible disk, a compact disc read-only memory (CD-ROM), a magneto-optical (MO) disk, a digital versatile disc (DVD), a magnetic disk, and a semiconductor memory.

Moreover, it is possible to install the program in the computer from the removable recording medium 111 as described above or can be downloaded to the computer via a communication network or a broadcasting network to be installed in the hard disk 105 included therein. That is, in one example, it is possible to transfer the program to the computer from a download site via a satellite for digital satellite broadcasting in a wireless manner or to transfer it to the computer via a network such as a local area network (LAN) or the Internet in a wired manner.

The computer has a built-in central processing unit (CPU) 102, and an input/output interface 110 is connected to the CPU 102 via a bus 101.

If a user inputs a command to the CPU 102 via the input/output interface 110 by operating an input unit 107 or the like, the CPU 102 executes the program stored in the read-only memory (ROM) 103 in accordance with the command. Alternatively, the CPU 102 loads the program stored in the hard disk 105 into a random access memory (RAM) 104 and executes the program.

This allows the CPU 102 to execute the processing in accordance with the above-mentioned flowchart or the processing performed by using the configuration of the above-mentioned block diagram. Then, in one example, the CPU 102 outputs the result obtained by the processing through an output unit 106 or transmits the result through a communication unit 108 via the input/output interface 110 as necessary and stores the result in the hard disk 105.

Moreover, the input unit 107 includes a keyboard, a mouse, a microphone, or the like. In addition, the output unit 106 includes a liquid crystal display (LCD), a speaker, or the like.

In this regard, in this specification, the computer does not necessarily need to perform the processing in accordance with the program in order shown in the flowchart in a time series. That is, the processing performed by the computer in accordance with the program also includes processing executed in parallel or individually (e.g., parallel processing or object-oriented processing).

Further, it is possible to process the program may be processed by a single computer (processor) or to dispersedly process it by a plurality of computers. Furthermore, it is possible to transfer the program to a remote computer for execution.

Furthermore, in this specification, a system means a set of a plurality of constituent elements (device, module (component), and the like), and all the constituent elements may or may not be received in the same housing. Thus, a plurality of devices received in different housings and connected via a network are a system, and any single device in which a plurality of modules are received in a single housing is a system.

Moreover, embodiments of the present technology are not limited to the above embodiment, and various kinds of modification can be performed within the scope of the present technology.

In one example, the present technology can employ cloud-computing configuration in which a single function is shared by a plurality of devices via a network and is cooperatively processed by the plurality of devices.

The above-mentioned steps shown in the flowcharts can be executed by a single device or can be cooperatively executed by a plurality of devices.

Furthermore, in the case where a plurality of processes are included in a single step, the plurality of processes included in the single step can be executed by a single device or can be cooperatively executed by a plurality of devices.

The effects described in this specification are merely examples and are not limited, and other effects may be exerted.

Additionally, the present technology may also be configured as below.

<1>

An image capture device including:

an image capture unit configured to capture an image at a predetermined image capture timing; and a control unit configured to control the image capture timing so that image capture is performed N times during an exposure time in which at least a part of a turn-on period in which an image capture target is on overlaps with an exposure time of image capture of at least one time at a timing of dividing a blinking cycle in which the image capture target to be captured by the image capture unit blinks into N equal parts where N represents more than one.

<2>

The image capture device according to <1>, in which the control unit controls the image capture timing so that the image capture is performed N times during an exposure time exceeding a lower limit exposure time SHT_MIN obtained in accordance with a formula SHT_MIN=Tb/N−TbDb/100, where Tb [sec] represents a blinking cycle of the image capture target, Db [%] represents a turn-on duty ratio at which the image capture target is turned on in the blinking cycle, and SHT_MIN [sec] represents the lower limit exposure time for overlapping an exposure time of the image capture of at least one time with at least a part of the turn-on period.

<3>

The image capture device according to <1> or <2>, in which the control unit controls the image capture timing every frame or frames with respect to different blinking cycles.

<4>

The image capture device according to <1> or <2>, in which, when a blinking cycle of a first image capture target is a cycle that is a power of two of a blinking cycle of a second image capture target, the control unit controls the image capture timing with respect to the blinking cycle of the first image capture target.

<5>

The image capture device according to any of <1> to <4>, further including:

a processing unit configured to process N captured images obtained by the image capture performed N times and to generate an output image of one frame.

<6>

The image capture device according to <5>, in which the processing unit obtains, as a pixel value of the output image, a maximum value among pixel values of corresponding pixels that are pixels of the N captured images which correspond to pixels of the output image.

<7>

The image capture device according to <5>, in which the processing unit obtains, as a pixel value of the output image, an average value of pixel values of corresponding pixels that are pixels of the N captured images which correspond to pixels of the output image.

<8>

The image capture device according to <5>, in which, when a maximum value among pixel values of corresponding pixels that are pixels of the N captured images which correspond to pixels of the output image is saturated, the processing unit obtains the maximum value as a pixel value of the output image, and when none of pixel values of the corresponding pixels of the N captured images are saturated, the processing unit obtains an average value of pixel values of the corresponding pixels of the N captured images as the pixel value of the output image.

<9>

The image capture device according to <5>, in which the processing unit obtains a value corresponding to a maximum value among pixel values of corresponding pixels that are pixels of the N captured images which correspond to pixels of the output image as a blend ratio used to blend the maximum value and an average value of the pixels values of the corresponding pixels of the N captured images, and obtains a blend value obtained by blending the maximum value and the average value in accordance with the blend ratio as a pixel value of the output image.

<10>

The image capture device according to <5>, in which the processing unit obtains a value corresponding to a motion amount of a pixel of the output image as a blend ratio used to blend a maximum value among pixel values of corresponding pixels that are pixels of the N captured images which correspond to pixels of the output image or an average value of the pixel values of the corresponding pixels and a pixel value of a corresponding pixel of a generation image that is one predetermined captured image among the N captured images, and obtains a blend value obtained by blending the maximum value or the average value and the pixel value of the corresponding pixel of the generation image in accordance with the blend ratio as a pixel value of the output image.

<11>

The image capture device according to <5>, in which the processing unit obtains a blend ratio used to blend a maximum value among pixel values of corresponding pixels that are pixels of the N captured images which correspond to pixels of the output image or an average value of the pixel values of the corresponding pixels and a pixel value of a corresponding pixel of a generation image that is one predetermined captured image among the N captured images, depending on a position of a pixel of the output image, and obtains a blend value obtained by blending the maximum value or the average value and the pixel value of the corresponding pixel of the generation image in accordance with the blend ratio as a pixel value of the output image.

<12>

The image capture device according to <5>, in which, when the image capture device is mounted on a moving object, the processing unit obtains a blend ratio used to blend a maximum value among pixel values of corresponding pixels that are pixels of the N captured images which correspond to pixels of the output image or an average value of the pixel values of the corresponding pixels and a pixel value of a corresponding pixel of a generation image that is one predetermined captured image among the N captured images, depending on one or more of a speed of the moving object, a steering angle of a steering wheel of the moving object, and a position of a pixel of the output image, and obtains a blend value obtained by blending the maximum value or the average value and the pixel value of the corresponding pixel of the generation image in accordance with the blend ratio as a pixel value of the output image.

<13>

The image capture device according to <5>, in which, when the image capture device is mounted on a moving object, the processing unit, depending on a maximum value among pixel values of corresponding pixels that are pixels of the N captured images which correspond to pixels of the output image and one or more of a speed of the moving object, a steering angle of a steering wheel of the moving object, and a position of a pixel of the output image, obtains a blend value obtained by blending the maximum value, an average value of the pixel values of the corresponding pixels and a pixel value of a corresponding pixel of a generation image that is one predetermined captured image among the N captured images as a pixel value of the output image.

<14>

The image capture device according to <5>, in which the processing unit, depending on an image capture condition, obtains a blend ratio used to blend a maximum value among pixel values of corresponding pixels that are pixels of the N captured images which correspond to pixels of the output image and an average value of the pixel values of the corresponding pixels, and obtains a blend value obtained by blending the maximum value and the average value in accordance with the blend ratio as a pixel value of the output image.

<15>

The image capture device according to <14>, in which the processing unit, depending on a position of a pixel of the output image, obtains the blend value or a pixel value of a corresponding pixel of a generation image that is one predetermined captured image among the N captured images as the pixel value of the output image.

<16>

A method of image capture including:

controlling a predetermined image capture timing so that image capture is performed N times during an exposure time in which at least a part of a turn-on period in which an image capture target is on overlaps with an exposure time of image capture of at least one time at a timing of dividing a blinking cycle in which the image capture target to be captured by an image capture unit configured to perform image capture at the image capture timing blinks into N equal parts where N represents more than one.

<17>

A program causing a computer to function as:

a control unit configured to control a predetermined image capture timing so that image capture is performed N times during an exposure time in which at least a part of a turn-on period in which an image capture target is on overlaps with an exposure time of image capture of at least one time at a timing of dividing a blinking cycle in which the image capture target to be captured by an image capture unit configured to perform image capture at the image capture timing blinks into N equal parts where N represents more than one.

<18>

A signal processing device including:

a processing unit configured to process N captured images obtained by image capture performed N times and to generate an output image of one frame, the image capture being performed N times by controlling a predetermined image capture timing so that the image capture is performed N times during an exposure time in which at least a part of a turn-on period in which an image capture target is on overlaps with an exposure time of image capture of at least one time at a timing of dividing a blinking cycle in which the image capture target to be captured by an image capture unit configured to perform image capture at the image capture timing blinks into N equal parts where N represents more than one.

<19>

A method of signal processing including:

processing N captured images obtained by image capture performed N times and generating an output image of one frame, the image capture being performed N times by controlling a predetermined image capture timing so that the image capture is performed N times during an exposure time in which at least a part of a turn-on period in which an image capture target is on overlaps with an exposure time of image capture of at least one time at a timing of dividing a blinking cycle in which the image capture target to be captured by an image capture unit configured to perform image capture at the image capture timing blinks into N equal parts where N represents more than one.

<20>

A program causing a computer to function as:

a processing unit configured to process N captured images obtained by image capture performed N times and to generate an output image of one frame, the image capture being performed N times by controlling a predetermined image capture timing so that the image capture is performed N times during an exposure time in which at least a part of a turn-on period in which an image capture target is on overlaps with an exposure time of image capture of at least one time at a timing of dividing a blinking cycle in which the image capture target to be captured by an image capture unit configured to perform image capture at the image capture timing blinks into N equal parts where N represents more than one.

REFERENCE SIGNS LIST 1 optical system
2 image sensor
3 memory
4 signal processing unit
5 output unit
6 timing control unit
51 average value image generation unit
52 maximum value image generation unit
53 generation image selection unit
54, 55 blend ratio setting unit
56 to 58 blend unit
101 bus
102 CPU
103 ROM
104 RAM
105 hard disk
106 output unit
107 input unit
108 communication unit
109 drive
110 input/output interface
111 removable recording medium

The invention claimed is:

1. An image capture device comprising:
circuitry configured to function as:
an image capture unit configured to capture an image at a predetermined image capture timing; and
a control unit configured to control the image capture timing so that image capture is performed N times during an exposure time in which at least a part of a turn-on period in which a target of image capture is on overlaps with an exposure time of image capture of at least one time at a timing of dividing a blinking cycle in which the a target of image capture to be captured by the image capture unit blinks into N equal parts where N represents more than one,
wherein, when a blinking cycle of a first target of image capture is a cycle that is a power of two of a blinking cycle of a second target of image capture, the control unit controls the image capture timing with respect to the blinking cycle of the first target of image capture.

2. The image capture device according to claim 1, wherein the control unit controls the image capture timing so that the image capture is performed N times during an exposure time exceeding a lower limit exposure time SHT_MIN obtained in accordance with a formula SHT_MIN=Tb/N−TbDb/100, where Tb [sec] represents a blinking cycle of the target of image capture, Db [%] represents a turn-on duty ratio at which the target of image capture is turned on in the blinking cycle, and SHT_MIN [sec] represents the lower limit exposure time for overlapping an exposure time of the image capture of at least one time with at least a part of the turn-on period.

3. The image capture device according to claim 1, wherein the control unit controls the image capture timing every frame or frames with respect to different blinking cycles.

4. The image capture device according to claim 1, further comprising:
a processing unit configured to process N captured images obtained by the image capture performed N times and to generate an output image of one frame.

5. The image capture device according to claim 4, wherein the processing unit obtains, as a pixel value of the output image, a maximum value among pixel values of corresponding pixels that are pixels of the N captured images which correspond to pixels of the output image.

6. The image capture device according to claim 4, wherein the processing unit obtains, as a pixel value of the output image, an average value of pixel values of corresponding pixels that are pixels of the N captured images which correspond to pixels of the output image.

7. The image capture device according to claim 4, wherein, when a maximum value among pixel values of corresponding pixels that are pixels of the N captured images which correspond to pixels of the output image is saturated, the processing unit obtains the maximum value as a pixel value of the output image, and when none of pixel values of the corresponding pixels of the N captured images are saturated, the processing unit obtains an average value of pixel values of the corresponding pixels of the N captured images as the pixel value of the output image.

8. The image capture device according to claim 4, wherein the processing unit obtains a value corresponding to a maximum value among pixel values of corresponding pixels that are pixels of the N captured images which correspond to pixels of the output image as a blend ratio used to blend the maximum value and an average value of the pixels values of the corresponding pixels of the N captured images, and obtains a blend value obtained by blending the maximum value and the average value in accordance with the blend ratio as a pixel value of the output image.

9. The image capture device according to claim 4, wherein the processing unit obtains a value corresponding to a motion amount of a pixel of the output image as a blend ratio used to blend a maximum value among pixel values of corresponding pixels that are pixels of the N captured images which correspond to pixels of the output image or an average value of the pixel values of the corresponding pixels and a pixel value of a corresponding pixel of a generation image that is one predetermined captured image among the N captured images, and obtains a blend value obtained by blending the maximum value or the average value and the pixel value of the corresponding pixel of the generation image in accordance with the blend ratio as a pixel value of the output image.

10. The image capture device according to claim 4, wherein the processing unit obtains a blend ratio used to blend a maximum value among pixel values of corresponding pixels that are pixels of the N captured images which correspond to pixels of the output image or an average value of the pixel values of the corresponding pixels and a pixel value of a corresponding pixel of a generation image that is one predetermined captured image among the N captured images, depending on a position of a pixel of the output image, and obtains a blend value obtained by blending the maximum value or the average value and the pixel value of the corresponding pixel of the generation image in accordance with the blend ratio as a pixel value of the output image.

11. The image capture device according to claim 4, wherein, when the image capture device is mounted on a moving object, the processing unit obtains a blend ratio used to blend a maximum value among pixel values of corresponding pixels that are pixels of the N captured images which correspond to pixels of the output image or an average value of the pixel values of the corresponding pixels and a pixel value of a corresponding pixel of a generation image that is one predetermined captured image among the N captured images, depending on one or more of a speed of the moving object, a steering angle of a steering wheel of the moving object, and a position of a pixel of the output image, and obtains a blend value obtained by blending the maximum value or the average value and the pixel value of the corresponding pixel of the generation image in accordance with the blend ratio as a pixel value of the output image.

12. The image capture device according to claim 4, wherein, when the image capture device is mounted on a moving object, the processing unit, depending on a maximum value among pixel values of corresponding pixels that are pixels of the N captured images which correspond to pixels of the output image and one or more of a speed of the moving object, a steering angle of a steering wheel of the moving object, and a position of a pixel of the output image, obtains a blend value obtained by blending the maximum value, an average value of the pixel values of the corresponding pixels and a pixel value of a corresponding pixel of a generation image that is one predetermined captured image among the N captured images as the pixel value of the output image.

13. The image capture device according to claim 4, wherein the processing unit, depending on an image capture condition, obtains a blend ratio used to blend a maximum value among pixel values of corresponding pixels that are pixels of the N captured images which correspond to pixels of the output image and an average value of the pixel values of the corresponding pixels, and obtains a blend value obtained by blending the maximum value and the average value in accordance with the blend ratio as a pixel value of the output image.

14. The image capture device according to claim 13, wherein the processing unit, depending on a position of a pixel of the output image, obtains the blend value or a pixel value of a corresponding pixel of a generation image that is one predetermined captured image among the N captured images as the pixel value of the output image.

15. A method of image capture comprising:
controlling a predetermined image capture timing so that image capture is performed N times during an exposure time in which at least a part of a turn-on period in which a target of image capture is on overlaps with an exposure time of image capture of at least one time at a timing of dividing a blinking cycle in which the target of image capture to be captured by image capture circuitry configured to perform image capture at the image capture timing blinks into N equal parts where N represents more than one; and
when a blinking cycle of a first target of image capture is a cycle that is a power of two of a blinking cycle of a second target of image capture, controlling the image capture timing with respect to the blinking cycle of the first target of image capture.

16. At least one non-transitory computer-readable storage medium encoded with executable instructions that, when executed by at least one processor, cause the at least one processor to perform a method comprising:
controlling a predetermined image capture timing so that image capture is performed N times during an exposure time in which at least a part of a turn-on period in which a target of image capture is on overlaps with an exposure time of image capture of at least one time at a timing of dividing a blinking cycle in which the target of image capture to be captured by image capture circuitry configured to perform image capture at the image capture timing blinks into N equal parts where N represents more than one; and
when a blinking cycle of a first target of image capture is a cycle that is a power of two of a blinking cycle of a second target of image capture, controlling the image capture timing with respect to the blinking cycle of the first target of image capture.

17. A signal processing device comprising:
circuitry configured to function as:
a processing unit configured to process N captured images obtained by image capture performed N times and to generate an output image of one frame, the image capture being performed N times by controlling a predetermined image capture timing so that the image capture is performed N times during an exposure time in which at least a part of a turn-on period in which a target of image capture is on overlaps with an exposure time of image capture of at least one time at a timing of dividing a blinking cycle in which the target of image capture to be captured by an image capture unit configured to perform image capture at the image capture timing blinks into N equal parts where N represents more than one, and by, when a blinking cycle of a first target of image capture is a cycle that is a power of two of a blinking cycle of a second target of image capture, controlling the image capture timing with respect to the blinking cycle of the first target of image capture.

18. A method of signal processing comprising:

processing N captured images obtained by image capture performed N times and generating an output image of one frame, the image capture being performed N times by controlling a predetermined image capture timing so that the image capture is performed N times during an exposure time in which at least a part of a turn-on period in which a target of image capture is on overlaps with an exposure time of image capture of at least one time at a timing of dividing a blinking cycle in which the target of image capture to be captured by image capture circuitry configured to perform image capture at the image capture timing blinks into N equal parts where N represents more than one, and by, when a blinking cycle of a first target of image capture is a cycle that is a power of two of a blinking cycle of a second target of image capture, controlling the image capture timing with respect to the blinking cycle of the first target of image capture.

19. At least one non-transitory computer-readable storage medium encoded with executable instructions that, when executed by at least one processor, cause the at least one processor to perform a method comprising:

processing N captured images obtained by image capture performed N times and generating an output image of one frame, the image capture being performed N times by controlling a predetermined image capture timing so that the image capture is performed N times during an exposure time in which at least a part of a turn-on period in which an target of image capture is on overlaps with an exposure time of image capture of at least one time at a timing of dividing a blinking cycle in which the target of image capture to be captured by image capture circuitry configured to perform image capture at the image capture timing blinks into N equal parts where N represents more than one, and by, when a blinking cycle of a first target of image capture is a cycle that is a power of two of a blinking cycle of a second target of image capture, controlling the image capture timing with respect to the blinking cycle of the first target of image capture.

* * * * *